United States Patent [19]

Tozaki et al.

[11] Patent Number: 5,758,008

[45] Date of Patent: May 26, 1998

[54] INFORMATION RECORDING APPARATUS AND INFORMATION REPRODUCING APPARATUS

[75] Inventors: Akihiro Tozaki, Tsurugashima; Hiroshi Nakamura, Tokorozawa, both of Japan

[73] Assignee: Pioneer Electronic Corporation, Tokyo, Japan

[21] Appl. No.: 671,652

[22] Filed: Jun. 28, 1996

[30] Foreign Application Priority Data

Jul. 4, 1995 [JP] Japan .................. 7-169103

[51] Int. Cl.$^6$ .................. H04N 5/76; H04N 5/92
[52] U.S. Cl. .................. 386/65; 386/95; 386/98; 386/111
[58] Field of Search .................. 386/1, 33, 65, 386/46, 95–96, 98,101, 104–106, 109, 111, 112, 125, 126; 360/18, 20, 27; 348/423; H04N 5/76, 5/92, 5/78, 5/781, 5/782, 5/928

[56] References Cited

U.S. PATENT DOCUMENTS 5,502,573  3/1996  Fujinami et al. .................. 386/65
5,521,922  5/1996  Fujinami et al. .................. 348/423
5,521,927  5/1996  Kim et al. .................. 348/423

Primary Examiner—Thai Tran
Attorney, Agent, or Firm—Morgan, Lewis & Bockius LLP

[57] ABSTRACT

The recording apparatus is provided with: a first signal process unit for compressing a video signal to generate a compression video signal and for dividing and multiplexing an audio signal and the compression video signal respectively by every predetermined multiplexing unit, to output a compression multiplexed signal; a second signal process unit for detecting a position in the record information of the video information for each compression unit; a third signal process unit for detecting a reproduction time to generate a content information signal corresponding to content information indicating the detected reproduction time and the content type of the partial piece of information; an addition information generating device for generating reproduction addition information including elapsed time information and the time-axis information; a multiplexing device for multiplexing the reproduction addition information signal and the compression multiplexed signal; and a recording device for recording the information multiplexed compression signal to the record medium.

13 Claims, 15 Drawing Sheets

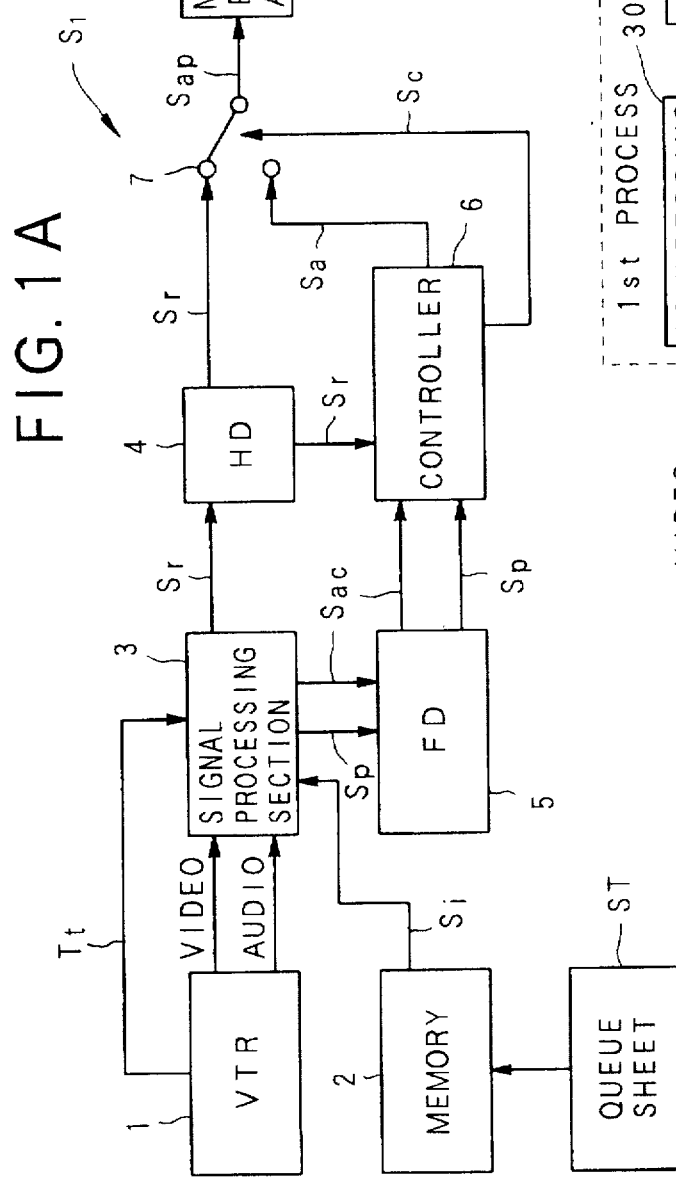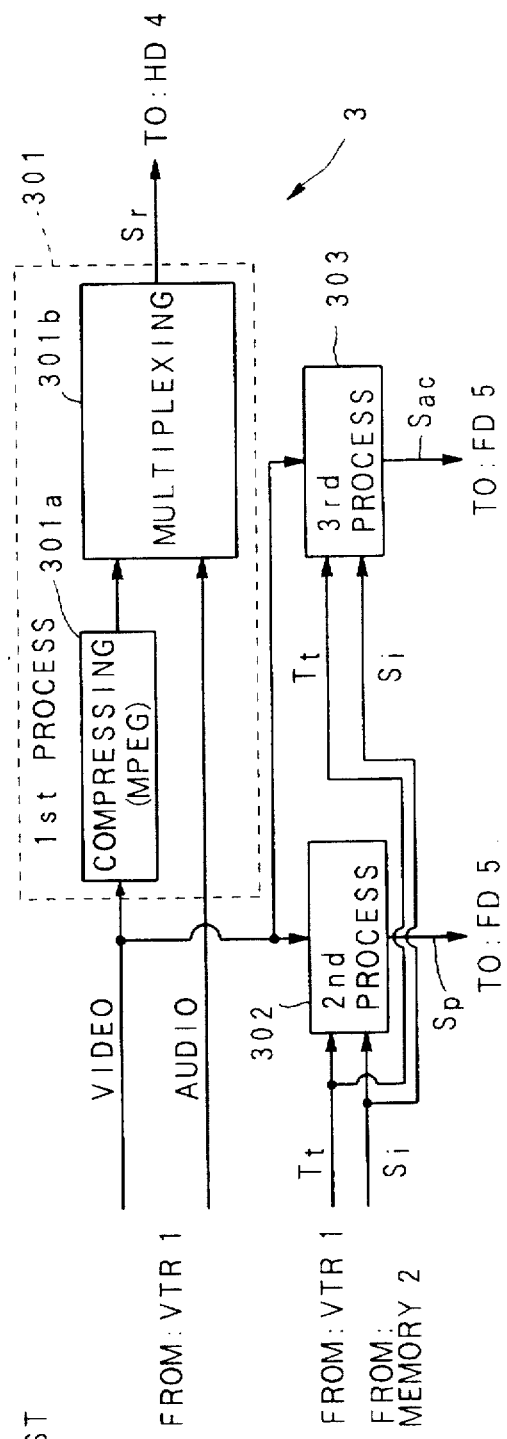

| field | No. of bits | value |
|---|---|---|
| SJP — packet_start_code_prefix | 24 | 000001h |
| SJS — stream_id | 8 | BFh |
| SJL — PES_packet_length | 16 | |
| SJT — PTS_of_applied_video | 32 | |
| SJC — CELTC | 32 | |

SJ

CELTC DATA SJC

| b31 b30 b29 b28 | b27 b26 b25 b24 |
|---|---|
| TIME (TENTH DIGIT) | TIME (UNIT DIGIT) |

| b23 b22 b21 b20 | b19 b18 b17 b16 |
|---|---|
| MINUTE (TENTH DIGIT) | MINUTE (UNIT DIGIT) |

| b15 b14 b13 b12 | b11 b10 b9 b8 |
|---|---|
| SECOND (TENTH DIGIT) | SECOND (UNIT DIGIT) |

| b7 b6 b5 b4 | b3 b2 b1 b0 |
|---|---|
| FRAME (TENTH DIGIT) | FRAME (UNIT DIGIT) |

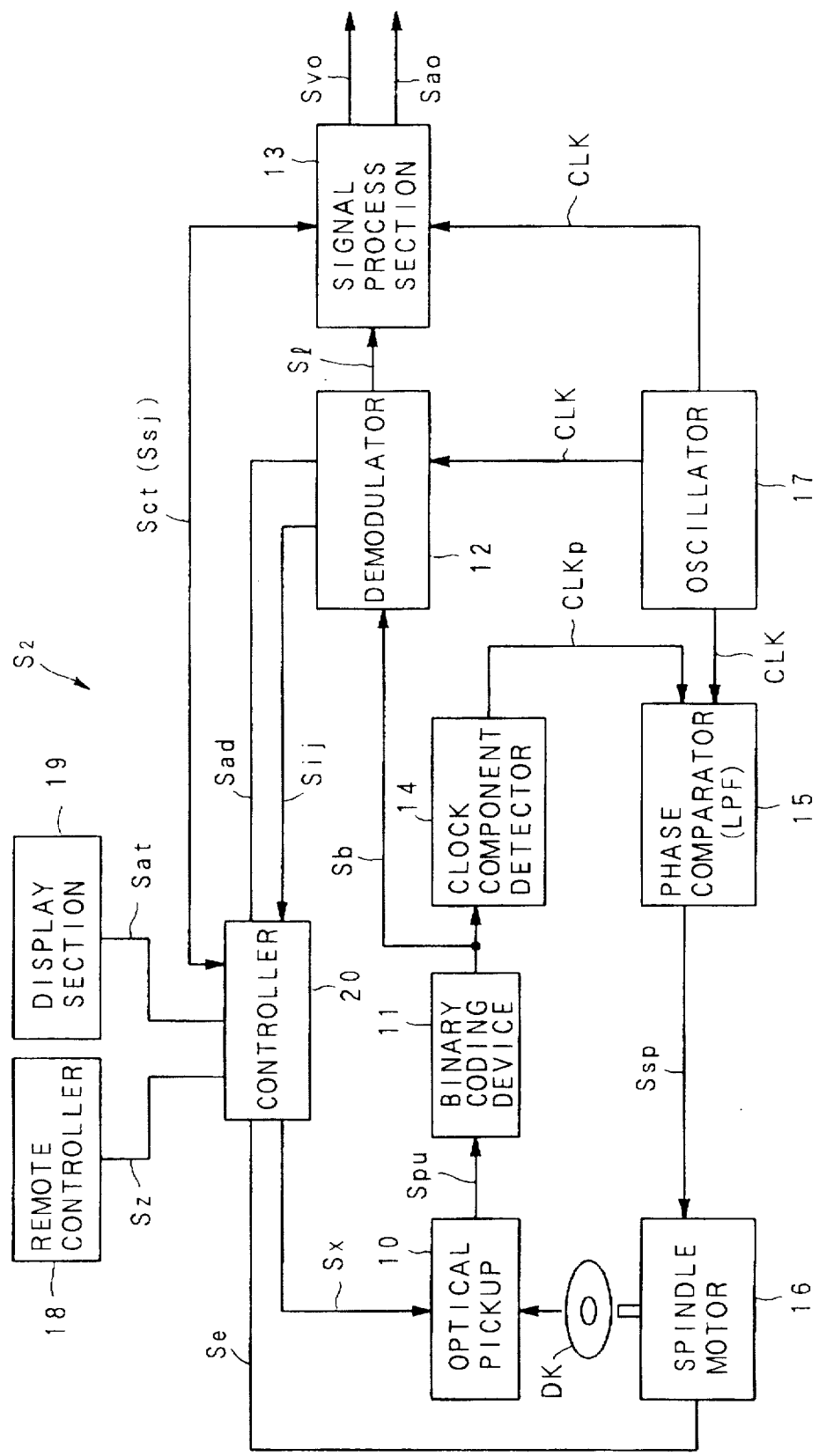

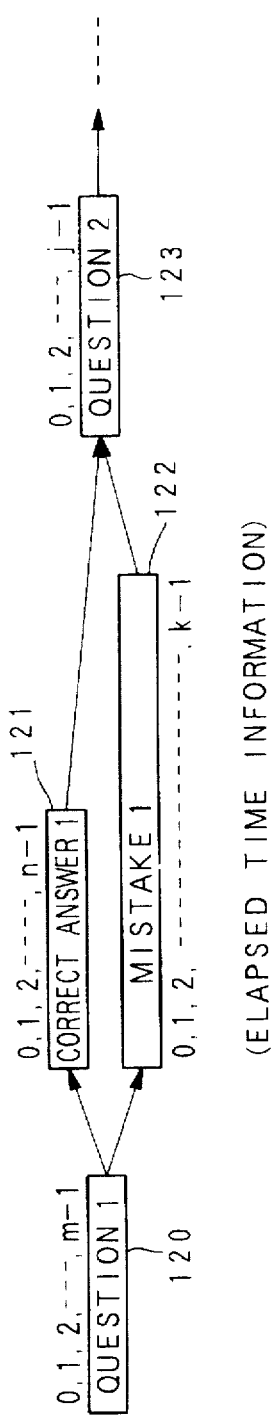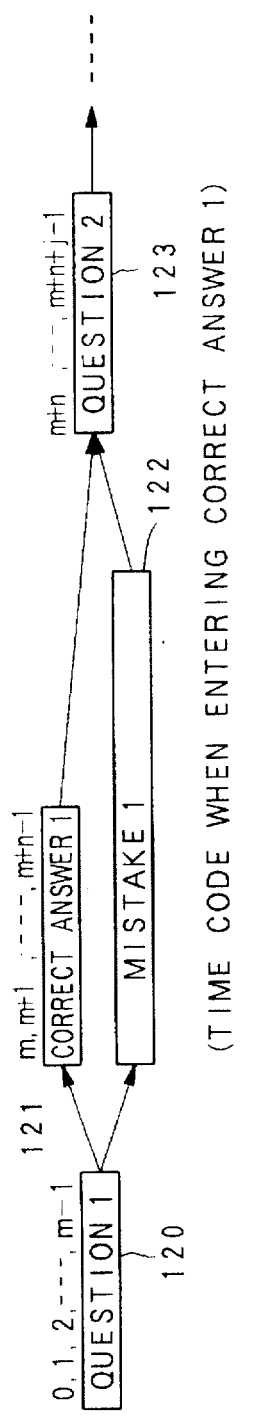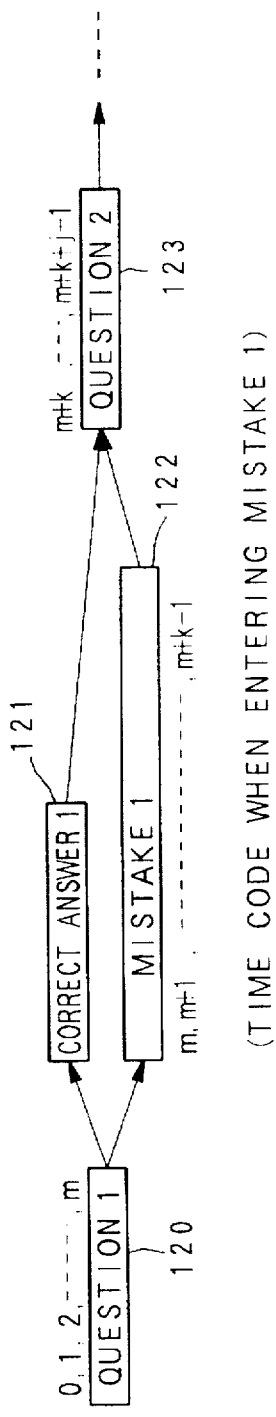

FIG. 9A

| ELAPSED TIME | 0,1,2,...,m-1 | 0,1,2,...,n-1 | 0,1,2,...,k-1 | 0,1,2,...,j-1 |
|---|---|---|---|---|
| | FIRST CHAPTER | SECOND CHAPTER | THIRD CHAPTER | FOURTH CHAPTER |

FIG. 9B

SJ { IJT, IJS }

| CONTENT | VALUE |
|---|---|
| TOTAL REPRODUCING TIME IN FIRST CHAPTER | m |
| TOTAL REPRODUCING TIME IN SECOND CHAPTER | n |
| TOTAL REPRODUCING TIME IN THIRD CHAPTER | k |
| TOTAL REPRODUCING TIME IN FOURTH CHAPTER | j |
| START ADDRESS IN FIRST CHAPTER | A |
| START ADDRESS IN SECOND CHAPTER | B |
| START ADDRESS IN THIRD CHAPTER | C |
| START ADDRESS IN FOURTH CHAPTER | D |

FIG. 9C

SJ { IJT, IJS }

| CONTENT | VALUE |
|---|---|
| TOTAL REPRODUCING TIME AT QUESTION 1 | m |
| TOTAL REPRODUCING TIME AT CORRECT ANSWER 1 | n |
| TOTAL REPRODUCING TIME AT MISTAKE 1 | k |
| TOTAL REPRODUCING TIME AT QUESTION 2 | j |
| START ADDRESS AT QUESTION 1 | a |
| START ADDRESS AT CORRECT ANSWER 1 | b |
| START ADDRESS AT MISTAKE 1 | c |
| START ADDRESS AT QUESTION 2 | d |

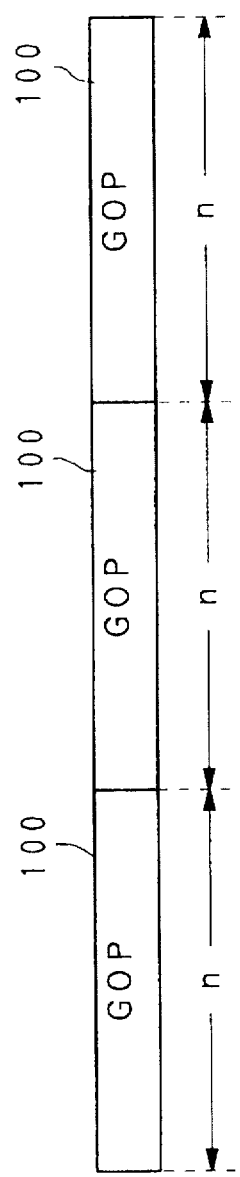
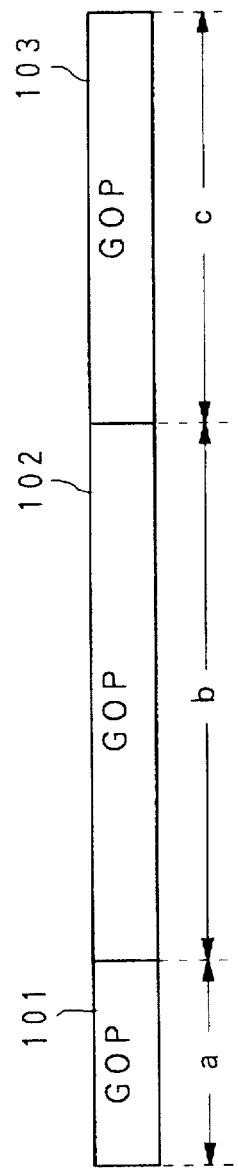
FIG.11A
FIG.11B

FIG.14

| time code | range of value | No. of bits |
|---|---|---|
| drop_frame_flag | | 1 |
| time_code_hours | 0-23 | 5 |
| time_code_minutes | 0-59 | 6 |
| marker_bit | 1 | 1 |
| time_code_seconds | 0-59 | 6 |
| time_code_pictures | 0-59 | 6 |

INFORMATION RECORDING APPARATUS AND INFORMATION REPRODUCING APPARATUS

BACKGROUND OF THE INVENTION

1. Field of the Invention

The present invention is related with an information recording apparatus and an information reproducing apparatus, and more particularly, it is related with an information recording apparatus for compressing a video signal, multiplexing it together with an audio signal and recording on a record medium, such as an optical disk and the like, and an information reproducing apparatus for reproducing the audio signal and the video signal from the appropriate record medium.

2. Description of the Related Art

Recently, an optical disk, a magneto optical disk, a magnetic tape and the like are generally used as a record medium for video information and audio information. Among them, as to the optical disk and the magneto optical disk, a relatively small type (e.g. a disk having a diameter equal to or less than 12 cm) is widely generalized because of its convenience.

On the other hand, as a recent multi-media technique is improved, a request is increased to record a movie or the like on the optical disk and the magneto optical disk. In order to correspond to this request, it is necessary to record the video information and the audio information with a longtime, on the optical disk or the magneto optical disk having the above mentioned convenient size. More concretely, it is desired to record the movie or the like corresponding to a running time equal to or more than 60 minutes, on the optical disk having a diameter of 12 cm. To this end, it is indispensable to carry out a data compression for the video information including an animation and the corresponding audio information to record them.

As a compressing method used in this data compression, generally, there is a method proposed at MPEG (Moving Picture Experts Group) that is an international standardization meeting for accumulation medium animation image encoding (hereafter, referred to as an MPEG method). It is noted as a standard for the compression method by means of high efficiency encoding of the video information.

Here, when schematically explaining the MPEG method, generally, in a case of consecutive frame images, the frame images located before and after one frame image have mutual relations which are similar to each other, in many cases. The MPEG method is a method of noting this point and generating, on the basis of a plurality of frame images transferred at an interval of a few frames, a different frame image existing between the pertinent plurality of frame images, by means of an interpolation operation based on a moving vector of an original image and the like. In this case, in a case of recording the different frame image, only by recording information with respect to a difference between the plurality of frame images and the moving vector, at a time of reproducing, it is possible to refer to them, predict from the above mentioned plurality of frame images and thereby reproduce the appropriate different frame image. As a result, it is possible to carry out the compression record of the image.

Here, in the MPEG method, a unit of GOP (Group of Picture) is used, as a minimum unit which enables a reproduction without referring to other images. FIG. 10 shows an example of a plurality of frame images constituting this one GOP. In FIG. 10, one GOP is composed of twelve sheets of frame images. However, in the frame images, a frame image illustrated by a sign [I] is referred to as an I picture (Intra-coded picture), and it means the frame image which can reproduce a perfect frame image from the image itself. And, a frame image illustrated by a sign [P] is referred to as a P picture (Predictive-coded picture), and it is a predictive image generated by decoding a difference from the predictive images which are compensation-reproduced on the basis of a demodulated I picture or other P pictures. And, a frame image illustrated by a sign [B] is referred to as a B picture (Bidirectionally predictive-coded picture), and it means a predictive image reproduced by using not only the demodulated I picture or P picture but also an future I picture or P picture recorded on an optical disk and the like to predict. FIG. 10 shows a predictive relation (interpolation relation) between respective pictures by using an arrow mark.

Here, as to data generation amount of one GOP, there are two different generation ways. FIG. 11A shows the GOP recorded by controlling a compression rate and the like such that the data generation amount (n, n, n) for each GOP 100 is always constant. If the data generation amount is constant, an address of each GOP and the data amount have proportional relation between each other. Thus, it is possible to easily search the appropriate address corresponding to a target time. On the other hand, FIG. 11B shows the GOP generated without controlling so as to make the data generation amount constant (a, b, c). At this time, in respective recorded GOPs 101, 102 and 103, the data amounts included therein become different from each other. Now, noting the data amount generated in a case that recorded video information is reproduced, the image in which movement of a raw image is hard has slightly relative relation between respective pictures. Thus, it is not possible to sufficiently utilize an effective compression method using the relative relation, and thereby the data amount generated in one GOP becomes large. On the other hand, the image in which the movement of the raw image is slight has largely relative relation between the respective pictures. Thus, it is possible to sufficiently utilize the effective compression method using the relative relation, and thereby the data amount generated in one GOP becomes slight. According to the method shown in FIG. 11A, each GOP is adapted to have always constant data amount irrespective of a content of a moving component of the raw image. Thus, image quality is made worse for the image whose movement is hard, and uselessness is induced in the image whose movement is slight. As a result, the method shown in FIG. 11B is desired in order to make the image quality uniform and to effectively utilize a record capacity of the optical disk.

Next, as shown in FIG. 12, when recording on the optical disk the video information compressed by the above mentioned MPEG method, together with audio information to which a predetermined process such as a compression and the like is applied, the compressed video information is time-divided into a data unit, which is referred to as a packet, under a constant data amount, and is multiplexed into one data stream. And, the video information and the audio information which are time-division-multiplexed are recorded with the above mentioned packet as a unit.

In the multiplexed stream data recorded in this way, as shown in FIG. 13, for the sake of convenience of synchronization management and access at a time of reproducing, time-axis information is added for every packet. In the MPEG method, this time-axis information is referred to as PTS (Presentation Time Stamp). In the PTS, a reproduction time of the video information or the audio information with respect each of the packets is described with 1/90000 sec as one unit (that is, 1 sec=90000 PTS). At a time of multiplexing the video information and the audio information to record, as shown in FIG. 13, the same PTSs are described and recorded on the corresponding image packet and sound packet. Thus, the reproducing apparatus refers to the PTSs and causes the packet of the video information and the packet of the audio information, in which the same PTSs are recorded on both packets, to be synchronized with each other, and thereby can reproduce the video information and the audio information by causing them to be synchronized with each other.

On the other hand, the PTS can be used as elapsed time information of the information at a time of reproducing. That is, by storing the PTS obtained from the optical disk at a time of starting the reproduction, obtaining a difference between the PTS detected in a middle of the reproduction and the PTS at the time of starting the reproduction, and dividing the difference by 90000, it is possible to obtain an elapsed time in the PTS detected on the middle from the beginning of the reproduction.

Further, in the optical disk according to the MPEG method, as a method of recognizing the elapsed time at a time of reproducing, there is a method of using a GOP header described at a lead portion of the above mentioned GOP.

This method describes, at each of the GOP headers, the elapsed time information (time code) from the beginning of the appropriate reproduction corresponding to the pertinent GOP. FIG. 14 shows a format of this time code.

In FIG. 14, [time code hours], [time code minutes], [time code seconds] and [time code pictures] indicates [time], [minute], [second] and [frame] in the time code, respectively. [marker bit] is fixed to [1].

Further, [drop frame flag] indicates whether or not two frames are to be skipped in a predetermined unit. Next, this drop frame will be described schematically.

In a case of a NTSC (National Television System Committee) method which is generalized in an image process field, a frame frequency is 29.97 Hz and is not an integer. Thus, a frame number per second can not be specified accurately. That is, in a case of displaying the elapsed time by using a time, a minute, a second and a frame, a case of 29 frames and a case of 30 frames are mixed in a carry from the frame to the second. For this reason, in a time code used in a VTR (Video Tape Recorder) and the like, an actually displayed reproduction time is adjusted by using the drop frame. That is, the carry to the second is carried out by skipping the frames corresponding to two frame numbers of [00] and [01] from the beginning for each minute except that the digits of the minute of the time code are [0], [10], [201], [30], [40] and [50]. In a case that the digits of the minute of the time code are [0], [10], [20], [30], [40] and [50], the carry to the second is carried out in 30 frames from [00] to [29]. The NTSC method can specify and display the accurate time code by using this process. In FIG. 14, the frames of [00] and [01] mentioned above a re skipped in the GOP in which [drop frame flag] is [1].

The compression multiplexed signal to which the above mentioned process is applied is recorded on the optical disk at a constant bit rate. However, it is necessary to display the elapsed time (reproduction time) associated with the reproduced video signal and audio signal at a time of reproducing, and it is necessary to describe the elapsed time information per constant unit, for the compression multiplexed signal to be recorded, in a case of searching an image in a particular elapsed time.

However, there are the following problems in the above mentioned two methods, with respect to the description of the elapsed time information.

At first, in order to obtain the elapsed time on the basis of the PTS, as mentioned above, the process of storing the PTS at the time of starting the reproduction, the process of subtracting the PTS at the time of starting the reproduction from the PTS detected at the middle of the reproduction and the process of dividing the difference by 9000 are needed. Further, in a case of reproducing consecutively, from 9000/ (30/1.001)=3003 (PTS), the process of increasing on e frame for every 3003 PTS is needed. Here, (30/1. 001) indicates an accurate frame frequency in the NTSC method, and 3003 PtS corresponds to a necessary time until one frame is reproduced. In addition to this, at a time of carrying from the frame to the second, it is necessary to perform the process by considering the above mentioned drop frame. Accordingly, there is a problem that a load onto a signal process controller in the reproducing apparatus is large due to necessity of these processes.

On the other hand, in a case of calculating the elapsed time on the basis of the time code (refer to FIG. 14) described at the GOP header, the time code can be easily obtained at each GOP unit. However, when judging the frame of the reproduced video signal to which the obtained time code is made corresponding, there are the following problems.

Here, an operation of the signal process section in the reproducing apparatus is explained, in order to explain the problems.

In a signal process section in the conventional reproducing apparatus, a t first, a demodulation signal from a demodulator is inputted to a system decoder. At this time, a video signal and an audio signal are multiplexed on the demodulation signal. And, the system decoder extracts various headers from the demodulation signal, and further separates into a video signal and an audio signal. At this time, the video signal and the audio signal remain in compressed states. The video signal and the audio signal are outputted to an audio decoder and a video decoder, respectively and individually, and extended and outputted as an audio extension signal and a video extension signal. Here, in the video decoder, a GOP header is extracted from each GOP. And, the audio extension signal is outputted to a D/A converter, D/A-converted, outputted as an output audio signal and outputted as sound by a predetermined amplifier (not shown). On the other hand, the video extension signal is outputted to a multiplexing section, and multiplexed on a reproduction time code, outputted to a D/A converter as a video multiplexed signal, D/A-converted and displayed on a monitor and the like as an output video signal.

In parallel to the above mentioned process, the system decoder, when extracting the various headers, takes out the PTS within the packet, and outputs to a signal process controller as a PTS signal. And, the signal process controller refers to each PTS in the audio signal and the video signal extracted by the system decoder, and outputs an audio start signal and a video start signal in order to synchronize the audio signal with the video signal (refer to FIG. 13). The audio decoder and the video decoder, on the basis of the audio start signal and the video start signal, outputs the audio extension signal and the video extension signal to thereby synchronize the audio extension signal with the video extension signal. Further, the signal process controller, on the basis of the GOP header extracted by the video decoder, outputs the reproduction time code included therein, and multiplexes it on the video extension signal.

In the above mentioned operation, when judging the frame included in the video extension signal to which the reproduction time code is made corresponding and multiplexed, it is necessary to multiplex on the basis of the PTS which defines both the reproduction times of the audio signal and the video signal. However, since the above mentioned PTS is taken out from the system decoder, the following processes are needed in order to accurately multiplex the reproduction time code to the video extension signal. That is, the signal process controller always stores a new PTS, and each time the GOP header and the reproduction time code included therein are outputted, reads out the PTS immediately before it, and outputs the reproduction time code on the basis of the value. However, carrying out the process each time the GOP header is outputted brings about a problem that it is a large load on the signal process controller.

Further, when displaying the elapsed time, there are the following problems resulting from the content itself of the video signal or the audio signal.

Namely, the above mentioned time code of the PTS or the GOP header is given at a consecutive order from the beginning of the appropriate record information, irrespective of the content of the record information.

Incidentally, when the record information to be recorded including the video signal and the audio signal is divided into a plurality of pieces of the partial record information on the basis of the content thereof, there may be a case that an interactive type of a relation as shown in FIG. 15A exists along a time-axis between mutual pieces of the partial record information. In an example of FIG. 15A, at first, an image and a sound indicating [question 1] are outputted as a dynamic image or a static image. And, in a case that a user inputs an answer and that it is a correct answer, the image and the sound indicating [Correct Answer 1] are outputted. If the user inputs an answer that is not the correct answer, the image and the sound indicating [Mistake 1] are outputted. And, after [Correct Answer 1] or [Mistake 1] is outputted, it is assumed that the image and the sound indicating next [question 2]. At this time, a picture plane of [Mistake 1] is displayed longer than a picture plane of [Correct Answer 1] in order to indicate a mistaken reason and the like. In a case of recording a video signal and an audio signal corresponding to the record information having the above mentioned configuration, it becomes a series of multiplexed compression signals as shown in FIG.15B. It jumps to [Correct Answer 1] or [Mistake 1] on the basis of the answer inputted by the user. However, a partial record information corresponding to [Correct Answer 1] is different in length from a partial record information 122 corresponding to [Mistake 1]. Thus, the elapsed time from the beginning of the record information at the lead portion of the appropriate [question 2] at a time of passing through [A correct Answer 1] to [Mistake 2] is different in elapsed time from the elapsed time from the beginning of the record information at the lead portion of [question 2] at a time of passing through [Mistake 1] to [question 2]. This results in a problem that it is impossible to use the elapsed time information (the time code in the PTS or the GOP header) at the consecutive order given by starting from the beginning of the record information for the multiplexed compression signals shown in FIG. 15B, as the elapsed time information.

SUMMARY OF THE INVENTION

Then, in view of the above various problems, it is therefore an object of the present invention to provide an information recording apparatus and an information reproducing apparatus, which can multiplex a time code to a video extension signal without imposing an excessive load on a signal process controller constituting the reproducing apparatus and also display an accurate elapsed time even in a case of an interactive type of record information.

The above object of the present invention can be achieved by an apparatus for recording record information, which includes video information and audio information and which are divided into a plurality of partial pieces of information in accordance with a predetermined content type of the record information in advance, to a record medium. The recording apparatus is provided with: a first signal process unit, to which the record information is inputted, for compressing a video signal based on the video information by every predetermined compression unit to generate a compression video signal, and for dividing and multiplexing an audio signal, which is based on the audio information in correspondence with the video information, and the compression video signal respectively by every predetermined multiplexing unit, to output a compression multiplexed signal which is a signal that the divided audio signal and the divided compression video signal are time-multiplexed; a second signal process unit for detecting a position in the record information of the video information corresponding to the video signal included in each compression unit to output a position signal for each compression unit; a third signal process unit for detecting a reproduction time in a case of reproducing each of the partial pieces of information to generate a content information signal corresponding to content information indicating the detected reproduction time and the content type of the partial piece of information; an addition information generating device for generating reproduction addition information including elapsed time information, which indicates an elapsed time within each of the partial pieces of information at a time of reproducing each of the partial pieces of information and which is reset at a lead portion of each of the partial pieces of information, and the time-axis information, which is counted from a beginning of the record information and which corresponds to the elapsed time, on the basis of the generated content information signal, to output a reproduction addition information signal; a multiplexing device for multiplexing the reproduction addition information signal and the compression multiplexed signal for each of the compression unit in the compression multiplexed signal, such that the reproduction addition information signal is included in the multiplexing unit, which is within the compression unit and which is different from that including the audio or video compression signal, to output an information multiplexed compression signal, on the basis of the generated position signal; and a recording device for recording the information multiplexed compression signal to the record medium.

According to the recording apparatus of the present invention, the video signal is compressed by every predetermined compression unit by the first signal process unit, so that the compression video signal is generated. Then, the audio signal and the compression video signal are divided and multiplexed respectively by every predetermined multiplexing unit by the first signal process unit, so that the compression multiplexed signal is outputted. Then, the position in the record information of the video information corresponding to the video signal included in each compression unit is detected by the second signal process unit, so that the position signal for each compression unit is outputted. Then, a third signal process unit for detecting the reproduction time in a case of reproducing each of the partial pieces of information is detected by the third signal process unit, so that the content information signal corresponding to content information indicating the detected reproduction time and the content type of the partial piece of information is generated. Then, the reproduction addition information including the elapsed time information and the time-axis information is generated on the basis of the generated content information signal, so that the reproduction addition information signal is outputted. Then, the reproduction addition information signal and the compression multiplexed signal are multiplexed for each of the compression unit in the compression multiplexed signal, such that the reproduction addition information signal is included in the multiplexing unit, which is within the compression unit and which is different from that including the audio or video compression signal, on the basis of the generated position signal. Thus, the information multiplexed compression signal is outputted. Finally, the information multiplexed compression signal is recorded by the recording device to the record medium.

Consequently, since the reproduction addition information which includes the elapsed time information (which indicates an elapsed time within each of the partial pieces of information at a time of reproducing each of the partial pieces of information and which is reset at a lead portion of each of the partial pieces of information) and the time-axis information (which is counted from a beginning of the record information and which corresponds to the elapsed time), is recorded together with the record information to the record medium, it is easy to multiplex the elapsed time information with respect to the reproduced (i.e. decoded and extended) video information at the time of reproduction.

In one aspect of the recording apparatus of the present invention, the partial pieces of information have a mutual relationship along a time axis in the record information and at least a first partial piece of which has such a mutual relationship that a second partial piece thereof non-consecutive to the first partial piece along the time axis is to be reproduced prior to a third partial piece thereof consecutive to the first partial piece on the time axis after the first partial piece is reproduced.

According to this aspect, since the elapsed time information is reset at the lead portion of each of the partial pieces of information, even if the partial pieces of information are reproduced in the reproducing order which is different from the recording order, the correct total elapsed time information, which corresponds to the whole reproduced record information, can be easily obtained by adding the elapsed time information in each of the partial pieces of information. Thus, in case of reproducing the record information of interactive type, the correct total elapsed time can be always obtained.

In another aspect of the recording apparatus of the present invention, the multiplexing device adds the reproduction addition information signal such that the reproduction addition information signal is recorded at the lead portion of each of the partial pieces of information.

According to this aspect, since the reproduction addition information signal is positioned at the lead portion of the partial piece of information, it is possible to easily and speedily detect the reproduction addition information signal when the partial piece of information is to be reproduced.

In another aspect of the recording apparatus of the present invention: the third signal process unit further detects a start position of each of the partial pieces of information in the record information, to generate the content information signal corresponding to the content information indicating the detected start position in addition to the detected reproduction time and the content type; the addition information generating device further generates construction addition information including reproduction time information corresponding to the reproduction time and start position information corresponding to the start position for each of the partial pieces of information, to output a construction addition information signal; and the multiplexing device adds the construction addition information signal to the compression multiplexed signal such that the construction addition information signal is timely separated from the compression multiplexed signal.

According to this aspect, the start position of each of the partial pieces of information in the record information is also detected by the third signal process unit, so that the content information signal is also generated. Then, the construction addition information, which includes the reproduction time information corresponding to the reproduction time and the start position information corresponding to the start position for each of the partial pieces of information, is also generated by the addition information generating device, so that the construction addition information signal is also generated. Then, the construction addition information signal is added to the compression multiplexed signal by the multiplexing device, such that the construction addition information signal is timely separated from the compression multiplexed signal.

Consequently, since the construction addition information, which includes the reproduction time information and the start position information for each of the partial pieces of information, is recorded in addition to the reproduction addition information together with the record information to the record medium, it is possible to detect the partial piece of information which includes a reproduction position, where the reproduction is to be started according to an instruction inputted from the external and which is specified with respect to the start position of the record information, and it is also possible to speedily reproduce the record information corresponding to the reproduction position with the time-axis information as a standard.

In this aspect, the partial pieces of information may have a mutual relationship along a time axis in the record information and at least a first partial piece of which has such a mutual relationship that a second partial piece thereof non-consecutive to the first partial piece along the time axis is to be reproduced prior to a third partial piece thereof consecutive to the first partial piece on the time axis after the first partial piece is reproduced.

In this case, since the elapsed time information is reset at the lead portion of each of the partial pieces of information, it is possible to detect the partial piece of information which includes the reproduction position which is specified with respect to the start position of the record information, and it is also possible to speedily reproduce the record information corresponding to the reproduction position with the time-axis information as a standard.

Further in this aspect, the multiplexing device may add the construction addition information signal such that the construction addition information signal is recorded at a lead-in area of the record medium.

In this case, since the construction addition information signal is positioned at the lead-in area of the record medium, it is possible to easily and speedily detect the construction addition information signal when the record information is to be reproduced.

The above object of the present invention can be also achieved by an apparatus for reproducing record information, which are divided into a plurality of partial pieces of information in accordance with a predetermined content type of the record information in advance, and reproduction addition information from a record medium on which the record information and the reproduction addition information are multiplexed by every predetermined multiplexing unit, the reproduction addition information including elapsed time information, which indicates an elapsed time within each of the partial pieces of information at a time of reproducing each of the partial pieces of information and which is reset at a lead portion of each of the partial pieces of information, and a time-axis information, which is counted from a beginning of the record information for every predetermined multiplexed unit and which corresponds to the elapsed time. The reproducing apparatus is provided with: a detecting device for detecting the record information and the reproduction addition information from the record medium and outputting a detection signal indicating the detected information; an extracting device for extracting, from the detection signal, a reproduction addition information signal corresponding to the detected reproduction addition information; a reproducing device for reproducing the record information on the basis of the detection signal; and a total elapsed time calculating device for, on the basis of the extracted reproduction addition information signal, adding the elapsed time within each of the partial pieces of information at a reproducing order to calculating a total elapsed time corresponding to the reproduced record information, and outputting a total elapsed time signal.

According to the reproducing apparatus of the present invention, the record information and the reproduction addition information are detected from the record medium by the detecting device, so that the detection signal is outputted. Then, the reproduction addition information signal corresponding to the detected reproduction addition information is extracted from the detection signal by the extracting device. The record information is reproduced on the basis of the detection signal by the reproducing device. At this time, on the basis of the extracted reproduction addition information signal, the elapsed time within each of the partial pieces of information is added at the reproducing order by the total elapsed time calculating device, so that the total elapsed time corresponding to the reproduced record information is calculated, and thereby the total elapsed time signal is outputted.

Consequently, the calculated total elapsed time can be displayed or can be used for various special reproducing operations (e.g. searching operation based on the elapsed time from the start position of the record information).

As one aspect of the reproducing apparatus of the present invention, the reproducing apparatus is further provided with a display device for displaying the total elapsed time on the basis of the total elapsed time signal.

According to this aspect, the calculated total elapsed time can be certainly displayed on the displaying device.

As another aspect of the reproducing apparatus of the present invention, the record information includes video information, the extracting device extracts, from the detection signal, a compression video signal into which the reproduction addition information signal corresponding to the reproduction addition information and the video signal corresponding to the video information are compressed, and the reproducing device is provided with: an extending device for extending the extracted compression video signal and outputting the video signal; and an elapsed time information multiplexing device for multiplexing, on the basis of the extracted reproduction addition information signal and the extended video signal, the elapsed time information in the reproduction addition information signal corresponding to the time-axis information included the video signal, to the video signal as elapsed time information corresponding to the video signal, and outputting an elapsed time information multiplexed video signal.

According to this aspect, the compression video signal is extracted from the detection signal by the extracting device. Then, the extracted compression video signal is extended by the extending device, so that the extended video signal is outputted. Then, on the basis of the extracted reproduction addition information signal and the extended video signal, the elapsed time information in the reproduction addition information signal corresponding to the time-axis information included the video signal, is multiplexed to the video signal as elapsed time information corresponding to the video signal, by the elapsed time information multiplexing device, so that the elapsed time information multiplexed video signal is outputted.

Consequently, since the elapsed time information included in the reproduction addition information is multiplexed to the extended video signal, which is extended on the basis of the corresponding time-axis information, it is easy to multiplex the video signal and the corresponding elapsed time information.

As another aspect of the reproducing apparatus of the present invention, the partial pieces of information have a mutual relationship along a time axis in the record information and at least a first partial piece of which has such a mutual relationship that a second partial piece thereof non-consecutive to the first partial piece along the time axis is to be reproduced prior to a third partial piece thereof consecutive to the first partial piece on the time axis after the first partial piece is reproduced.

According to this aspect, since the elapsed time information is reset at the lead portion of each of the partial pieces of information, even if the partial pieces of information are reproduced in the reproducing order which is different from the recording order, the correct total elapsed time information can be easily obtained by the total elapsed time calculating device. Thus, in case of reproducing the record information of interactive type, the correct total elapsed time can be always obtained.

As another aspect of the reproducing apparatus of the present invention, construction addition information is added to the record information on the record medium, the construction addition information including reproduction time information corresponding to a reproduction time and start position information corresponding to a start position for each of the partial pieces of information, the detecting device detects the construction addition information in addition to the record information and the reproduction addition information from the record medium according to a control signal, and the extracting device further extracts, from the detection signal, a construction addition information signal corresponding to the detected construction addition information. The reproducing apparatus is further provided with: an information detection device for detecting, on the basis of the extracted construction addition information signal, the partial piece of information which includes the record information corresponding to a reproduction position where the reproduction is to be started according to an instruction inputted from the external, the reproduction position being specified with respect to the start position of the record information; and a control device for generating and outputting to the detecting device, the control signal to move the detecting device to a position on the record medium corresponding to the reproduction position within the detected partial piece of information and to reproduce the partial piece of information corresponding to the reproduction position.

According to this aspect, the construction addition information is also detected from the record medium according to the control signal by the detecting device, and the construction addition information signal is also extracted from the detection signal by the extracting device. Then, on the basis of the extracted construction addition information signal, the partial piece of information which includes the record information corresponding to the reproduction position, is detected by the information detection device. Then, the control signal to move the detecting device and to reproduce the partial piece of information corresponding to the reproduction position is generated and outputted by control device to the detecting device.

Consequently, since the construction addition information includes the reproduction time information (which corresponds to the reproduction time) and the start position information (which corresponds to the start position) for each of the partial pieces of information can be detected besides the reproduction addition information, it is possible, when the reproduction position where the reproduction is to be started and which is specified with respect to the start position of the record information, is inputted from the external, to speedily detect the partial piece of information including the reproduction position, and speedily reproduce the record information corresponding to the reproduction position with the time-axis information as a standard.

As another aspect of the reproducing apparatus of the present invention, construction addition information is added to the record information on the record medium, the construction addition information including start position information corresponding to a start position for each of the partial pieces of information, the detecting device detects the construction addition information in addition to the record information and the reproduction addition information from the record medium according to a control signal, and the extracting device further extracts, from the detection signal, a construction addition information signal corresponding to the detected construction addition information. The reproducing apparatus is further provided with: a position detection device for detecting, on the basis of the extracted construction addition information signal, the start position of the partial piece of information which includes a reproduction position where the reproduction is to be started according to an instruction inputted from the external, the reproduction position being specified with respect to the start position of the record information; and a control device for generating and outputting to the detecting device, the control signal to move the detecting device to a position on the record medium corresponding to the reproduction position within the detected start position and to reproduce the partial piece of information corresponding to the reproduction position.

According to this aspect, the construction addition information is also detected according to the control signal by the detecting device, and from the detection signal, the construction addition information signal is also extracted from the detection signal by the extracting device. Then, on the basis of the extracted construction addition information signal, the start position of the partial piece of information which includes the reproduction position is detected by the position detection device. Then, the control signal to move the detecting device and to reproduce the partial piece of information corresponding to the reproduction position is generated and outputted by the control device to the detecting device.

Consequently, since the construction addition information for each of the partial pieces of information can be detected besides the reproduction addition information, it is possible, when the reproduction position where the reproduction is to be started and which is specified with respect to the start position of the record information, is inputted from the external, to speedily detect the partial piece of information including the reproduction position, and speedily reproduce the record information corresponding to the reproduction position with the time-axis information as a standard.

In this aspect, the partial pieces of information may have a mutual relationship along a time axis in the record information and at least a first partial piece of which has such a mutual relationship that a second partial piece thereof non-consecutive to the first partial piece along the time axis is to be reproduced prior to a third partial piece thereof consecutive to the first partial piece on the time axis after the first partial piece is reproduced.

In this case, since the elapsed time information is reset at the lead portion of each of the partial pieces of information, even if the partial pieces of information are reproduced in the reproducing order which is different from the recording order, it is possible, when the reproduction position where the reproduction is to be started and which is specified with respect to the start position of the record information, is inputted from the external, to speedily detect the partial piece of information including the reproduction position, and speedily reproduce the record information corresponding to the reproduction position with the time-axis information as a standard. Thus, in case of reproducing the record information of interactive type, the correct total elapsed time can be always obtained.

BRIEF DESCRIPTION OF THE DRAWINGS

FIG. 1 are diagrams for explaining a construction of an information recording apparatus according to an embodiment of the present invention, wherein FIG. 1A is a block diagram which shows a schematic configuration of the information recording apparatus, and FIG. 1B is a block diagram which shows a schematic configuration of a signal process section in the information recording apparatus of FIG. 1A;

FIG. 2 are diagrams for explaining construction addition information, wherein

FIG. 3 are figures for explaining reproduction addition information, wherein

FIG. 5 are figures for explaining an addition position of a PTS, wherein

FIG. 6 is a block diagram which shows a schematic configuration of an information reproducing apparatus according to an embodiment;

FIG. 8 are figures for showing a generation of a time code in an interactive type of record information, wherein FIG. 8A is a figure for showing elapsed time information for every partial record information, FIG. 8B is a figure for showing the time code of the whole record information in a case that an input answer corresponds to [Correct Answer 1], and FIG. 8C is a figure for showing the time code of the whole record information in a case that the input answer corresponds to [Mistake 1];

FIG. 9 are figures for explaining an access by using the construction addition information, wherein FIG. 9A is a figure for showing the elapsed time information for every partial record information in a case of a non-interactive type of record information, FIG. 9B is a figure for showing one example of a configuration of the construction addition information corresponding to the record information shown in FIG. 9A, and FIG. 9C is a figure for showing one example of a configuration of the construction addition information in a case of the interactive type of the record information shown in FIG. 8;

FIG. 11 is a figure for showing data generation amount of the GOP, wherein FIG. 11A is a figure for showing a case that the data generation amount of each GOP is constant, and FIG. 11B is a figure for showing a case that the data generation amount of each GOP is variable;

FIG. 14 is a figure for showing a configuration of the time code within a GOP header; and FIG. 15 are figures for explaining a reproduction and a record with respect to the interactive type of the record information, wherein

DESCRIPTION OF THE PREFERRED EMBODIMENTS

Figure 2A:
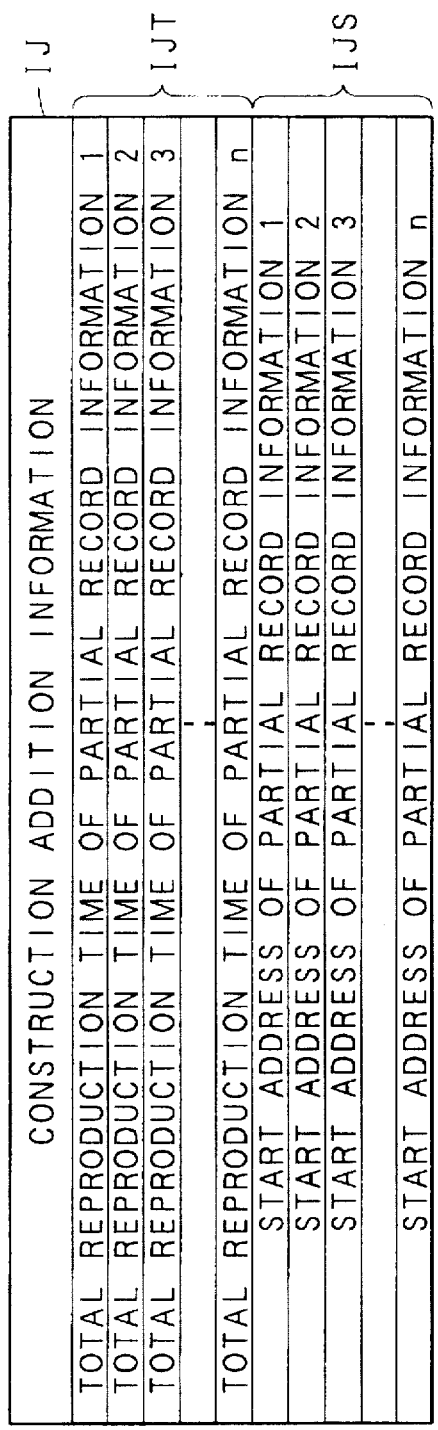
FIG. 2A is a figure for showing a construction thereof.
Figure 2B:
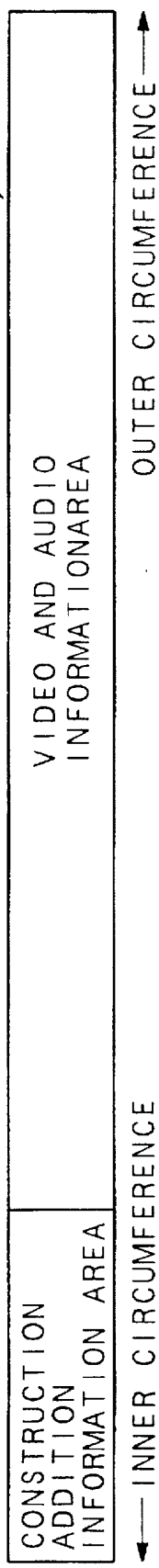
FIG. 2B is a figure for showing a recorded position on a stamper disk.

Next, preferred embodiments of the present invention will be explained with reference to the accompanying drawings. Incidentally, a case is explained in which the present invention is applied to an information recording apparatus for recording information on an optical disk as an information record medium, and an information reproducing apparatus for reproducing the record information from the optical disk on which the record information is recorded by the information recording apparatus.

(I) Information Recording Apparatus

A construction and an operation of the information recording apparatus are explained with reference to FIGS. 1 to 5.

At first, the construction of the information recording apparatus according to an embodiment is explained with reference to FIGS. 1A and 1B.

As shown in FIG. 1A, the information recording apparatus S1 according to the embodiment is provided with a VTR (Video Tape Recorder) 1, a memory 2, a signal process section 3, a hard disk (HD) device 4, a flexible disk (FD) device 5, a controller 6, a mutiplexer 7, a modulator 8 and a mastering device 9. The VTR 1 temporarily records record information, such as audio information, video information and the like, to be recorded. The memory 2 divides in advance the record information into partial pieces of record information for every content type, and stores a content signal, which is inputted in advance on the basis of a queue sheet ST including a start time for every partial record information in the record information together with the content type corresponding to each partial record information, and is composed of the above mentioned content signal and the start time of the partial record information corresponding to each of the content types.

The signal process section 3 A/D-converts the audio information and the video information outputted from the VTR 1, and then applies a compression process to every GOP by means of the MPEG method, and time-axis-multiplexes the audio information and the video information at a packet unit, and outputs as a compression multiplexed signal Sr. The signal process section 3 also outputs a position signal Sp, which indicates a start position in the record information of each GOP, on the basis of a time code Tt corresponding to the record information outputted from the VTR 1 and a content signal Si outputted from the memory 2, and further detects a reproduction time in a case that the appropriate partial record information for each partial record information is reproduced, and a partial record information start address in the record information in each partial record information, on the basis of the time code Tt and the content signal Si outputted from the memory 2. The signal process section 3 generates content information together with the corresponding content type, and outputs a content information signal Sac.

FIG. 1B shows a more detailed construction of the signal process section 3. As shown in FIG. 1B, the signal process section 3 is provided with a first signal process unit 301 having a compressing portion 301a for compressing the video signal by the MPEG method and a multiplexing portion 301b for multiplexing the compressed video signal and the audio signal to generate the compression multiplexed signal Sr, a second signal process unit 302 for generating the position signal Sp on the basis of the content signal Si and the time code Tt, and a third signal process unit 303 for generating the content information signal Sac on the basis of the content signal Si and the time code Tt.

In FIG. 1A again, the hard disk (HD) device 4 temporarily stores the compression multiplexed signal Sr. The flexible disk (FD) device 5 temporarily records the content information signal Sac and the position signal Sp. The controller 6 carries out a whole control of the information recording apparatus S1, and also, on the basis of the compression multiplexed signal Sr read out from the hard disk device 4 and the content information signal Sac and the position signal Sp read out from the FD device 5, generates construction addition information including the reproduction time in each partial record information and the start address in the record information, and reproduction addition information including an elapsed time at a time of reproducing each partial record information and the PTS of the video information reproduced in the appropriate elapsed time. The controller 6 also generates addition information from the construction addition information and the reproduction addition information and then outputs an addition information signal Sa. The controller 6 further time-separates the construction addition information from the compression multiplexed signal Sr and records it on an optical disk, and also outputs an information selecting signal Sc for time-axis-multiplexing the reproduction addition information at a lead portion of each GOP in the compression multiplexed signal Sr. The multiplexer 7, which functions as an addition multiplexing means (multiplexing means), time-separates the construction addition information in the addition information signal Sa from the compression multiplexed signal Sr, adds it to the appropriate compression multiplexed signal Sr, on the basis of the information selecting signal Sc. The multiplier 7 also time-axis-multiplexes the reproduction addition information in the addition information signal Sa at the lead portion of each GOP in the compression multiplexed signal Sr, and then outputs an information addition multiplexed compression signal Sap. The modulator 8 carries out, for example, an addition of an error correction code (ECC), such as a REED SOLOMON sign and the like, and a modulation, such as a 8 to 15 modulation and the like, with respect to the appropriate information addition compression multiplexed signal Sap, and then generates a disk record signal Sm. The mastering device 9, which functions as a recording means, records the appropriate disk record signal Sm on a stamper disk DKS which becomes a master (a punching die) at a time of fabricating (i.e. replicating) the optical disk.

Here, the signal process section 3 in the above configuration functions as a first signal process means, a second signal process means and a third signal process means, and the controller 6 functions as a construction addition information generating means, a reproduction addition information generating means, an addition multiplexing means and a multiplexing means.

Next, the operation of the information recording apparatus S1 will be explained.

The record information (the audio information and the video information) recorded temporarily in the VTR 1 is A/D-converted by the signal process section 3, and then compressed by means of the MPEG method, and time-axis-multiplexed into the compression multiplexed signal Sr, and stored temporarily in the hard disk device 4.

In parallel to this, on the basis of the content signal Si including the content type and the start time for every partial record information, which is inputted on the basis of the description of the queue sheet ST and is stored in the memory 2, the signal process section 3 refers to the time code Tt inputted from the VTR 1 and thereby outputs the position signal Sp for indicating the start position in the record information in each GOP. The signal process section 3 further detects the reproduction time in a case that the appropriate partial record information for each partial record information is reproduced, and the partial record information start address in the record information in each partial record information. The signal process section 3 generates the content information together with the corresponding content type and outputs the corresponding content information signal Sac. Then, the FD device 5 temporarily stores it together with the position signal Sp. The above mentioned processes are carried out for the whole record information.

When the above mentioned processes are finished for the whole record information, the controller 6 reads out the compression multiplexed signal Sr from the hard disk device 4 and also reads out the content information signal Sac and the position signal Sp from the FD device 5, generates the construction addition information and the reproduction addition information as the addition information, and outputs the addition information signal Sa corresponding to the appropriate addition information. Contents of the construction addition information and the reproduction addition information will be described later.

After that, the compression multiplexed signal Sr is multiplexed to the addition information signal Sa. At this time, the construction addition information signal corresponding to the construction addition information is time-separated from the compression multiplexed signal Sr, and is added to the appropriate compression multiplexed signal Sr so as to be recorded at the most inner circumference portion (lead-in area) of the stamper disk DKS apart from the compression multiplexed signal Sr. On the other hand, the reproduction addition information signal corresponding to the reproduction addition information is time-axis-multiplexed, at the lead portion of each GOP in the compression multiplexed signal Sr, to a packet different from a packet including the video information and the audio information included the appropriate GOP. In this way, the information addition multiplexed compression signal Sap is generated by multiplexing (adding) the compression multiplexed signal Sr to the addition information signal Sa. And, the addition of the error correction cord (ECC), such as the REED SOLOMON sign and the like, and the modulation, such as the 8 to 15 modulation and the like, are carried out by the modulator 8 for the information addition multiplexed compression signal Sap. The modulated disk record signal Sm is recorded onto the stamper disk DKS by the mastering device 9. And, the optical disk as a replica disk, which is generally sold on a market, is fabricated by a replication device by using this stamper disk DKS.

Next, the construction addition information and the reproduction addition information generated by the controller 6 will be explained with reference to FIGS. 2 to 5.

At first, the construction addition information will be explained with reference to FIG. 2.

As shown in FIG. 2A, a construction addition information IJ is composed of a reproduction time data IJT in which total reproduction time is described for each partial record information (refer to FIG. 16), and a start address data IJS in which the start address in each record information is described for each of the partial record information. The construction addition information signal corresponding to this construction addition information IJ is time-separated from the compression multiplexed signal Sr as mentioned above, and is recorded in a construction addition information area at the most inner circumference portion of the stamper disk DKS as shown FIG. 2B.

Next, the reproduction addition information will be explained with reference to FIGS. 3 to 5.

At first, the construction of the reproduction addition information will be explained with reference to FIG. 3.

Figures 3A, 3B:
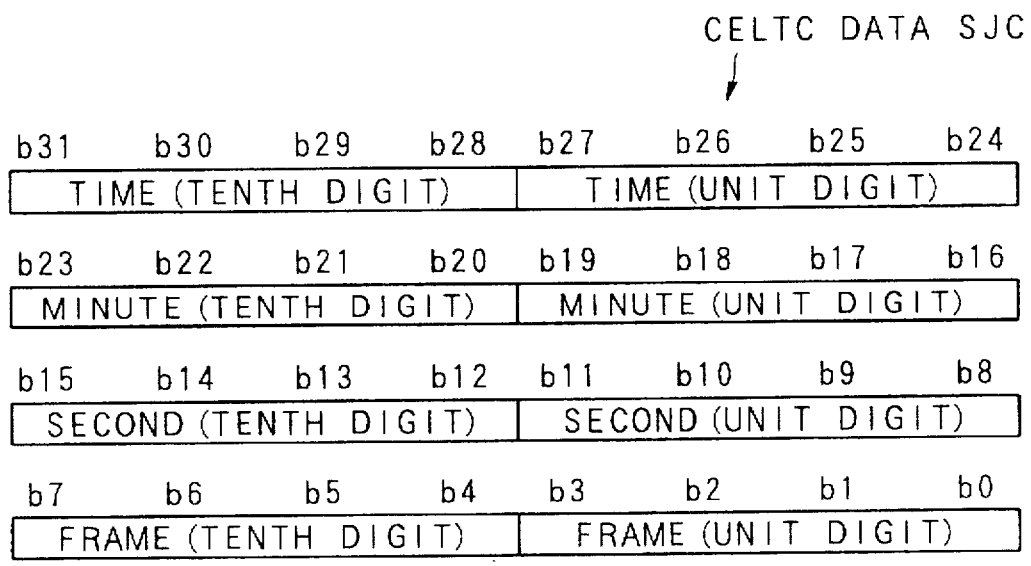
FIG. 3A is a figure for showing a construction thereof.
FIG. 3B is a figure for showing a construction of CELTC data SJC.

As mentioned above, a reproduction addition information SJ is stored in a packet (a stream ID of the packet is a type of a private stream2 in the MPEG method), which is different from a packet for the video signal and the audio signal in the compression multiplexed signal Sr. As shown in FIG.3A, the construction of the packet is composed of a packet start code prefix data SJP, a stream id data SJS, a PES packet length data SJL, a PTS of applied video data SJT and a CELTC data SJC. Here, the six-byte data composed of the packet start code prefix data SJP, the stream id data SJS and the PES packet length data SJL is a packet header of the private stream2 which content described is fixed by the MPEG method. And, it is ruled in such a way that a user can freely use the data other than it. In this embodiment, the PTS of applied video data SJT (hereafter, referred to as a PTS data SJT) and the CELTC data SJC are described. Here, the PTS data SJT describes the PTS of the video information to be reproduced in an elapsed time (which is an elapsed time within each partial record information and is reset to [0] at a lead portion of the partial record information) described in the CELTC data SJC. Further, the CELTC data SJC describes the elapsed time, which is within each partial record information and is reset to [0] at the lead portion of the partial record information. Here, FIG. 3B shows the construction of the CELTC data SJC in detail. That is, the tenth digit and the unit digit are separated from each other, for each data of a time, a minute, a second and a frame. Four bits are assigned to each of them. Accordingly, they become 32 bits as a whole.

Next, a construction of data stream when this reproduction addition information SJ is multiplexed to the compression multiplexed signal Sr will be described with reference to FIGS. 4 and 5.

Figure 4:
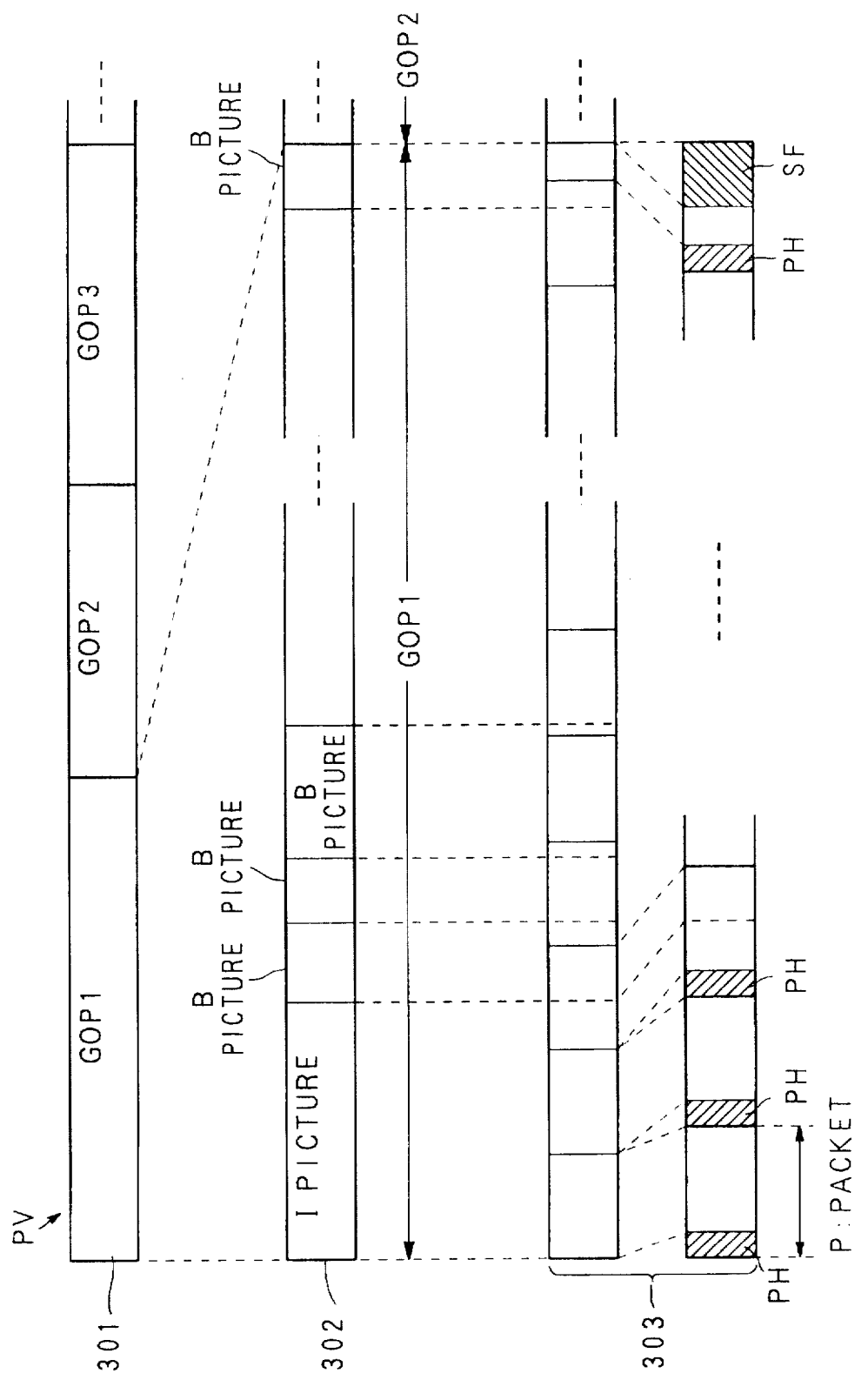
FIG. 4 is a figure for showing a relation between a GOP and a packet, wherein data arrangement of GOPs in a compression video signal PV, data arrangement of picture data in one GOP and data arrangement of packets in each picture data are shown.

As described in the related art section, normally, in a case of compressing the video information and then generating a compression video signal PV, a length (data amount) of each GOP is varied, as shown in FIG. 4A, on the basis of data amount of a picture included in each GOP. And, a plurality of I pictures, B pictures and the like are included in one GOP, and the data amount in each of the pictures is different in data arrangement 302 of one GOP. Here, at a time of time-axis-multiplexing the compression video signal PV and the audio signal, the compression video signal PV is divided into the packet which is a multiple-unit of a constant data amount, as in data arrangement 303 illustrated in FIG. 4. In FIG. 4, a dashed line in the GOP indicates a border portion between the respective pictures. Each packet header PH is added to each packet P. However, when one picture is started in one packet, it is possible to describe the PTS of the picture relevant to the packet header PH. In a case of the data arrangement 303, it is possible to describe, in a first packet P and a third packet P, the respective corresponding PTSs. However, in this embodiment, it is assumed that the PTS is described only in the packet P located at the lead portion of each GOP.

Further, a shaded portion shown by a sign SF in the data arrangement 303 in FIG. 4 indicates a portion to which data is added by a stuffing. Here, the stuffing means that data, which is not related to actual image data, for example, such as [FFh (h indicates a hexadecimal digit)] and the like, is added in order to match the data amount within the packet P. In an example of the data arrangement 303, the stuffing is carried out for a portion which is not full of the data amount within the packet P for each GOP.

The video signal, to which the above mentioned process is applied, is multiplexed to the audio signal, and becomes the compression multiplexed signal Sr.

Figure 5A:
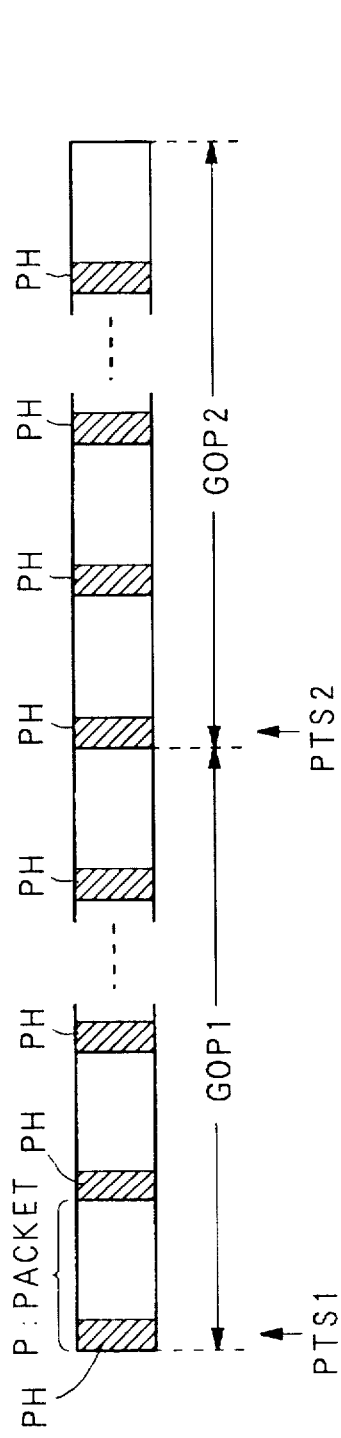
FIG. 5A is a figure for showing a relation between the GOP and the PTS.

Incidentally, the above mentioned process is carried out by the signal process section 3. Thus, such a process always makes the lead portion of the GOP coincident with the lead portion of the packet P. As shown in FIG. 5A, a PTS (illustrated by signs PTS1 and PTS2 in FIG. 5A) of a first picture within the GOP is described in the packet P corresponding to the lead portion of the GOP.

Here, assuming a frame frequency to be 29.97 (30/1.001) Hz, a difference between PTSn and PTSnt1 in FIG. 5A is 9000/(30/1.001)×15=45045, assuming a frame number constituting the GOP to be 15 frames. Each PTS in FIG. 5A corresponds to a display time at a time of reproducing the lead picture in the corresponding GOP.

On the other hand, as for the audio information, for example, with a compression unit as an audio unit, the same process is carried out for every audio unit. Here, in this embodiment, since the audio information has no concept of the GOP, when the audio unit is started within the packet P, it is defined that the PTS is described within its packet header PH.

Figure 5B:
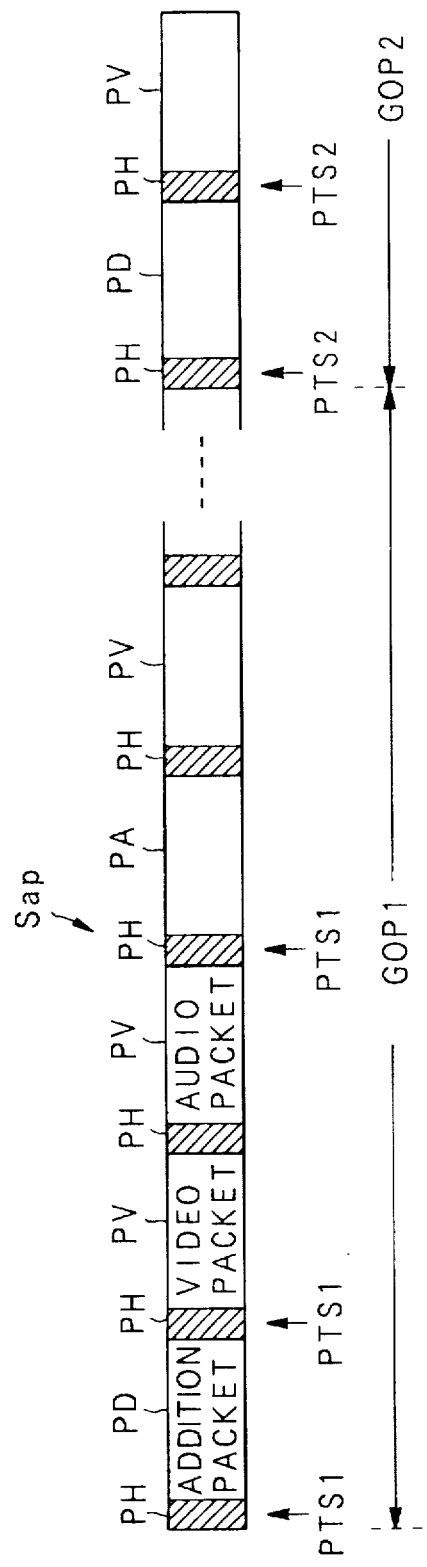
FIG. 5B is a figure for showing a relation between an information addition multiplexed compression signal and the PTS.

Further, as shown in FIG. 5B, the reproduction addition information SJ in this embodiment is described (time-axis-multiplexed) by providing an addition packet PD, which is different from the packet including the video information and the audio information, for each GOP. The PTS (the PTS of the first picture within the GOP) described in the GOP to which the appropriate addition packet PD belongs is described in its packet header PH.

According to the above mentioned information recording apparatus SI, the reproduction addition information SJ including the CELTC data SJC for every partial record information and the PTS data SJT corresponding to the appropriate CELTC data SJC is recorded together with the record information. Thus, at a time of reproducing, it is easy to multiplex the elapsed time information to a demodulated and extended video information. Further, the CELTC data SJC is reset at the lead for each partial record information. Thus, even in a case of reproducing an order different from a recording order of the partial record information, it is possible to display correct elapsed time information corresponding to the reproduced whole record information, by adding the CELTC data SJC in each partial record information.

Further, the reproduction addition information SJ, and the construction addition information IJ including the reproduction time for every partial record information and the partial record information start address in the record information are recorded together with the record information. Thus, at a time of reproducing, when a desired reproduction position with the reproduction start position of the record information as a starting point is inputted, it is possible to detect the partial record information including the appropriate reproduction position, and also possible to quickly reproduce the record information corresponding to the appropriate reproduction position with the PTS as a standard.

Furthermore, at a time of reproducing, when a desired reproduction position with the start point of the partial record information as the start point is inputted, it is possible to detect the partial record information including the appropriate reproduction position, and also possible to quickly reproduce the record information corresponding to the appropriate reproduction position with the PTS as the standard.

(II) Information Reproducing Apparatus

Next, a configuration and an operation of an information reproducing apparatus will be explained with reference to FIGS. 6 to 9.

At first, the construction of the information reproducing apparatus according to an embodiment is explained with reference to FIGS. 6 and 7.

As shown in FIG. 6, the information reproducing apparatus S2 according to the embodiment is provided with an optical pickup 10, a binary coding device 11, a demodulator 12, a signal process section 13, a clock component detector 14, a phase comparator 15, a spindle motor 16, an oscillator 17 and a controller 20. The optical pickup 10, which is a detecting means, detects the disk record signal Sm from an optical disk DK, in which the addition information signal Sa including the construction addition information IJ and the reproduction addition information SJ is multiplexed (added) to the compression multiplexed signal Sr by the above mentioned information recording apparatus SI and is recorded as the disk record signal Sm, and outputs it as a detection signal Spu. The binary coding device 11 converts the read detection signal Spu into a binary value on the basis of a constant threshold and outputs it as a binary signal Sb. The demodulator 12, which is an extracting means, applies a demodulation and an error correction to the binary signal Sb, outputs the result as a demodulation signal SI, and also extracts a construction addition information signal Sij corresponding to the construction addition information IJ from the binary signal Sb. The signal process section 13 carries out an extending process for the demodulation signal S1 by means of the MPEG method, D/A converts it and outputs it as an output video signal Sao and an output video signal Svo. The clock component detector 14 detects a clock component from the binary signal Sb, and outputs it as a detection clock signal CLKP. The phase comparator 15 includes a LPF (Low Pass Filter) for phase-comparing the detection clock signal CLKP with a standard clock signal CLK from the oscillator 17, generating a comparison signal, removing a high band component from the comparison signal and outputting it as a rotation number control signal Ssp for the spindle motor 16. The spindle motor 16 rotates the optical disk DK under the rotation number control on the basis of the rotation number control signal Ssp. The oscillator 17 outputs the standard clock signal CLK to set a timing synchronization between respective elements constituting the information reproducing apparatus S2. The controller 20 carries out a whole control of the information reproducing apparatus S2, stores the construction addition information IJ corresponding to the construction addition information signal Sij, and by using this, on the basis of a specifying signal Sz for specifying a reproduction position to be reproduced, which is inputted from a remote controller 18, and an address signal Sad corresponding to an address of a presently reproduced record information, which is outputted from the demodulator 11, outputs a spindle control signal Se and a slider control signal Sx to reproduce the partial record information corresponding to the reproduction position specified by the appropriate specifying signal Sz. The controller 20 further outputs to a display section 19 as a display means a total elapsed time signal Sat indicating a total elapsed time at a time of reproducing the record information. And, the controller 20 sends and receives a control signal Sct for controlling the signal process section 13, to and from the signal process section 13. A reproduction addition information signal Ssj corresponding to the reproduction addition information SJ extracted by the signal process section 13 is included in the control signal Sct sent to the controller 20 from the signal process section 13. The optical pickup 10 is moved on the optical disk DK by an operation of a slider (not shown) on the basis of the slider control signal Sx and reproduces the record information to be reproduced.

Here, the controller 20 functions as a total elapsed time calculating means, a reproduction portion record information detecting means, a control means and a partial record information start position detecting means.

Figure 7:
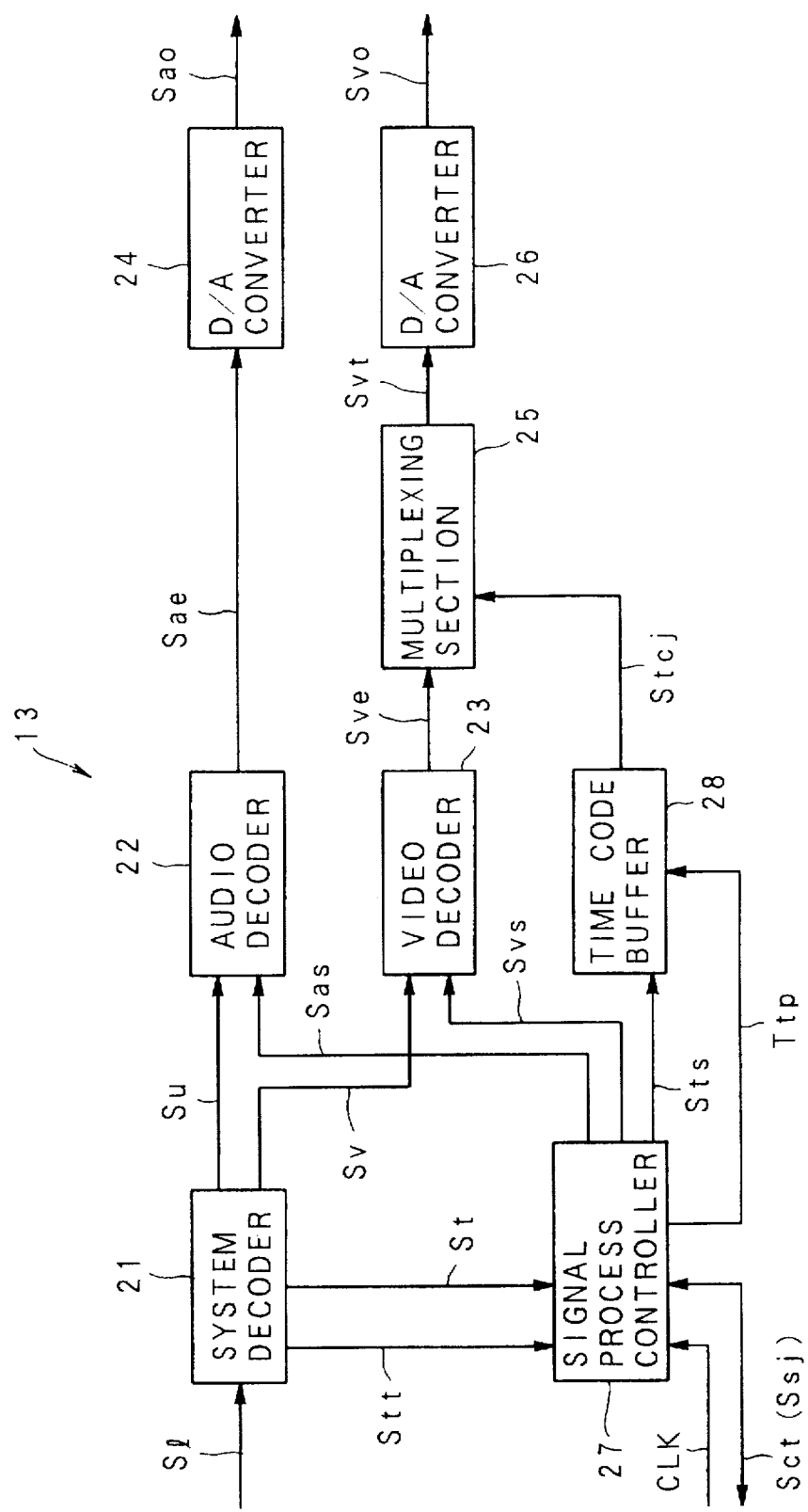
FIG. 7 is a block diagram which shows a schematic configuration of a signal process section of the embodiment of FIG. 6.
Figure 10:
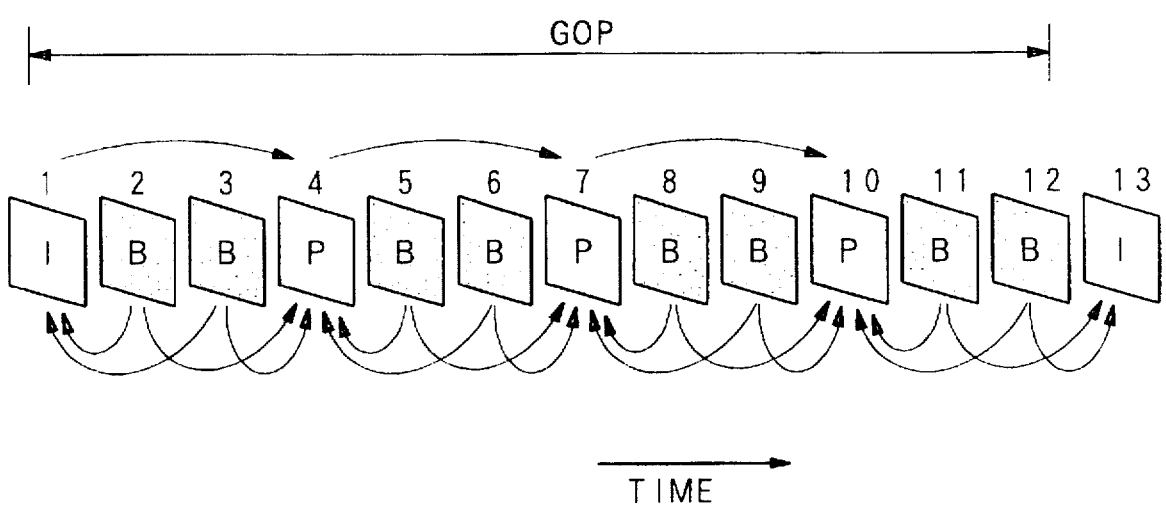
FIG. 10 is a figure for showing a frame image constituting the GOP.
Figure 12:
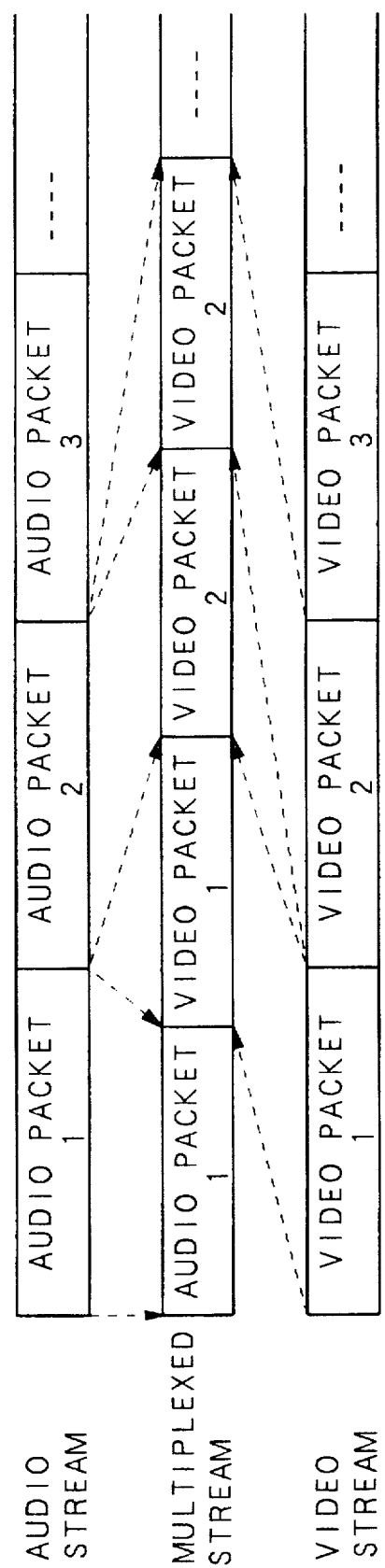
FIG. 12 is a figure for explaining a generation of multiplexed stream.
Figure 13:
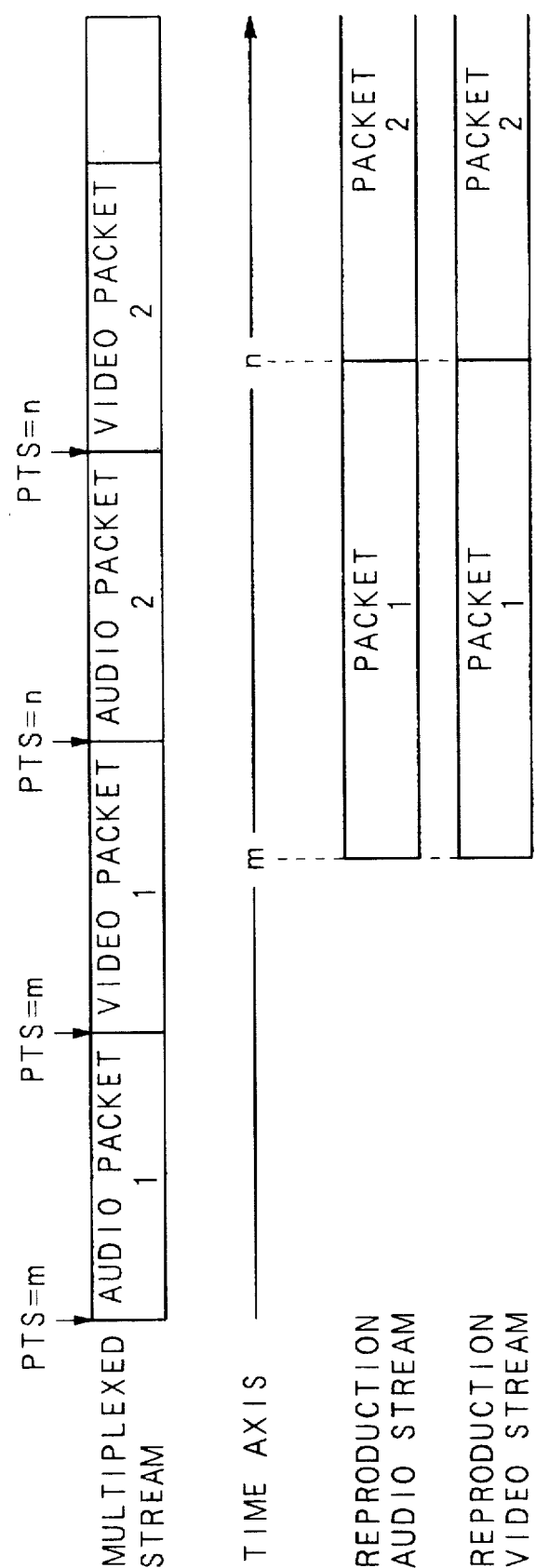
FIG. 13 is a figure for explaining a synchronization between a video stream and an audio stream.
Figure 15A:
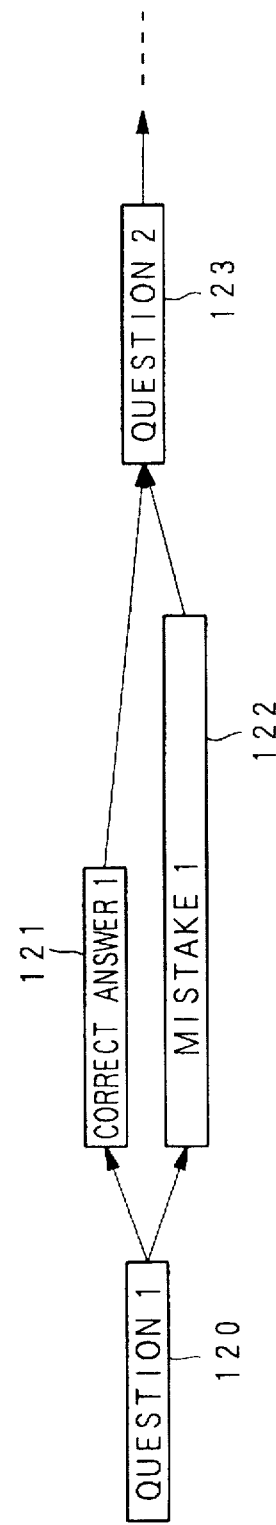
FIG. 15A is a figure for explaining a reproducing manner.
Figure 15B:
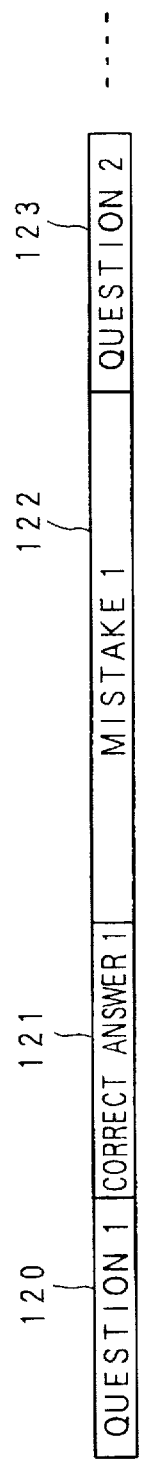
FIG. 15B is a figure for explaining a recording manner.

And, as shown in FIG. 7, the signal process section 13 is provided with: a system decoder 21 for taking out various headers from the demodulation signal S1 of the demodulator 12 and also separating it into a video signal Sv and an audio signal Su; an audio decoder 22 for extending the audio signal Su and outputting an audio extension signal Sae; a D/A converter 24 for D/A-converting the audio extension signal Sae and outputting an output audio signal Sao; a video decoder 23 for extending the video signal Sv and outputting a video extension signal Sve; a multiplexing section 25 for multiplexing a time code multiplexed signal Stcj described later to the video extension signal Sve and outputting a video multiplexed signal Svt; a D/A converter 26 for D/A-converting the video multiplexed signal Svt and outputting an output video signal Svo; a time code buffer 28 for outputting a time code multiplexed signal Stcj on the basis of a reproduction time code Ttp and a time start signal Sts from a signal process controller 27 described later; and the signal process controller 27 as an elapsed time information multiplexing means for, on the basis of the standard clock signal CLK from the oscillator 17, controlling the signal process section 13 as a whole and also sending and receiving the control signal Sct including the reproduction addition information signal Ssj, to and from the controller 20.

Here, as to the outputs of the output video signal Svo and the output audio signal Sao by means of the signal process section 13 under the control of the control signal Sct, while moving the optical pickup 10 by means of the slider control signal Sx to a position in which the appropriate partial record information is recorded in order to reproduce the partial record information to be reproduced, an image immediately before moving is outputted as a static image for the output video signal Svo, and the output of the output audio signal Sao is interrupted.

Further, in a case of recording by means of the information recording apparatus S1, the disk record signal Sm is modulated such that a clock can be self-extracted at a time of reproducing. Thus, it is possible to detect the extraction clock signal CLKP in the clock component detector 14.

Next, the operation of the information reproducing apparatus S2 will be explained with reference to FIGS. 6 to 9, mainly as for a reproduction operation in which the construction addition information IJ and the reproduction addition information SJ are used.

At first, the reproduction operation, in which the reproduction addition information SJ is used, is explained together with an operation of the signal process section 13.

As shown in FIG. 7, in the signal process section 13, the demodulation signal SI from the demodulator 12 is inputted to the system decoder 21. At this time, the video signal and the audio signal are multiplexed on the demodulation signal S1. And, the system decoder 21 extracts the various headers from the demodulation signal S1, and further separates it into the video signal Sv and the audio signal Su. At this time, the video signal Sv and the audio signal Su still remain in the compressed state. The video signal Sv and the audio signal Su are outputted to the audio decoder 22 and the video decoder 23, respectively and individually, and extended and outputted as the audio extension signal Sae and the video extension signal Sve, respectively. And, the audio extension signal Sae is outputted to the D/A converter 24, D/A-converted and outputted as the output audio signal Sao, and outputted as sound by a predetermined amplifier and the like (not shown). On the other hand, the video extension signal Sve is outputted to the multiplexing section 25, multiplexed to the time code multiplexed signal Stcj described later, outputted as the video multiplexed signal Svt to the D/A converter 26, D/A-converted and displayed as the output video signal Svo on a monitor and the like (not shown).

In parallel to the above processes, the system decoder 21, at a time of extracting the various headers, takes out the PTS within the packet header included in the demodulation signal S1, and outputs it as a PTS signal St to the signal process controller 27. Further, in parallel to this, the system decoder 21 takes out the reproduction addition information SJ within the addition packet PD, and outputs the CELTC data SJC included therein and the PTS data SJT corresponding to the CELTC data SJC, as the elapsed time signal Stt, to the signal process controller 27. Here, since only one reproduction addition information SJ is included in each GOP as mentioned above, elapsed time information corresponding to a frame other than the fame corresponding to the picture reproduced at the lead portion of each GOP is calculated on the basis of increment for every frame in the signal process controller 27. The elapsed time information generated in this way is outputted to the time code buffer 28 as the reproduction time code Ttp, and stored temporarily there. Then, the signal process controller 27 refers to each PTS of the reproduction addition information SJ included in the audio signal Su, the video signal Sv and the elapsed time signal Stt, on the basis of the PTS signal St, and outputs an audio start signal Sas, a video start signal Svs and the time start signal Sts to the audio decoder 22, the video decoder 23 and the time code buffer 28, respectively, so as to simultaneously output the audio signal Su and the video signal Sv having the same PTS and the reproduction time code Ttp. By means of the video start signal Svs and the time start signal Sts, the video decoder 23 outputs the video extension signal Sve, the time code buffer 28 outputs the time code multiplexed signal Stcj corresponding to the video signal included in the video extension signal Sve, and then they are multiplexed by the multiplexing section 25. At this time, since the video extension signal Sve and the time code multiplexed signal Stcj corresponding to each other with the PTS as a standard, are simultaneously outputted and multiplexed, a correct time code can be multiplexed for the video extension signal Sve.

Here, the elapsed time information (CELTC data SJC) included in the reproduction addition information SJ taken out by the system decoder 21 is reset at the lead portion of each partial record information. Thus, the time code to be multiplexed to the video extension signal Sve is also set to [0] at the lead portion of each partial record information. Further, the signal process controller 27 comprises a time code counter (not shown) within it. This counter is preset by the elapsed time information (CELTC data SJC) in the reproduction addition information, and incremented each time an image frame corresponding to the picture is changed.

On the other hand, the reproduction addition information SJ is outputted as the control signal Sct from the signal process controller 27 to the controller 20.

As a result of the above mentioned processes, as to a result of adding the elapsed time information to each partial record information, FIG. 8A shows a result of adding the elapsed time information to an interactive type of record information as shown in FIG. 16. As shown in FIG. 8A, an elapsed time information (0, 1, 2, ... ), which is consecutive within each partial record information and is also reset at the lead portion of each of the partial record information to [0] in each partial record information 120 to 123.

Then, as to the interactive type of the record information shown in FIG. 8A, in a case of displaying the elapsed time from the beginning of the record information, for example, as shown in FIG. 8B, if an answer inputted next to the partial record information 120 indicating [question 1] corresponds to [correct answer 1], a result of adding a last elapsed time in the partial record information 120 indicating [question 1] to the elapsed time in the partial record information 121 indicating [correct answer 1] is the elapsed time in the partial record information 121 indicating the appropriate [correct answer 1]. Similarly, in the partial record information 123 indicating [question 2] next to the partial record information 121 indicating [correct answer 1], a result of adding the elapsed time in the partial record information 123 indicating [question 2] to a last elapsed time in the partial record information 121 indicating [correct answer 1] is the elapsed time in the partial record information 123 indicating the appropriate [question 2]. Also in a case shown in FIG. 8C, similarly, the elapsed time is added in an order of the partial record information 120 indicating [question 1], the partial record information 122 indicating [mistake 1] and the partial record information 123 indicating [question 2]. This adding operation is carried out the by the controller 20, on the basis of the reproduction addition information SJ inputted to the controller 20 as the control signal Sct, and it is outputted to the display section 19 as the total elapsed time signal Sat indicating a total elapsed time at a time of reproducing the record information. Thus, a correct total elapsed time is displayed irrespective of a reproducing route of the record information.

Incidentally, in this embodiment, the time record multiplexed signal Stcj including the elapsed time information is multiplexed to the video extension signal Sve. However, it is allowable to add the elapsed time for each partial record information to thereby obtain the total elapsed time information, as mentioned above, and to multiplex it to the video extension signal Sve to thereby display the total elapsed time together with the output video signal Svo.

Next, an reproduction operation using the construction addition information IJ will be explained with reference to FIG. 9.

As mentioned above, the construction addition information IJ is extracted in the demodulator 12, and outputted to the controller 20 as the construction addition information signal Sij and stored therein.

This construction addition information IJ is described as shown in FIG. 9B, in a case of the record information which is not the interactive type as shown in FIG. 9A. Here, for example, when the specified signal Sz indicating the access to a portion of a time of [x] from the beginning of reproducing the record information shown in FIG. 9A (the time of [x] is a middle through a third chapter in FIG. 9A) is inputted from the remote controller 18, the controller 20 carries out the following operations (1) to (4).

(1) On the basis of the reproduction time data IJT included in the construction addition information SJ (FIG. 9B), from $$(m+n) < x < (m+n+k),$$

it is detected that the record information corresponding to the time of [x] is included in the third chapter.

(2) On the basis of the start address data IJS included in the construction addition information SJ (FIG. 9B), a start address [C] of the third chapter is obtained.

(3) "a=x−m−n" is calculated to thereby detect a position of [a] corresponding to the elapsed time information (CELTC data SJC) within the reproduction addition information SJ of the partial record information corresponding to the third chapter. Then, the slider control signal Sx is outputted in order to move the optical pickup 10 to the position on the optical disk DK corresponding to the above detected position.

(4) The reproduction is started from the position of the elapsed time [a] in the third chapter.

The above mentioned process is the reproduction operation in which the construction addition information IJ is used, in a case of a non-interactive type.

Next, an reproduction operation will be explained in which the construction addition information IJ is used in a case of the interactive type of the record information as shown in FIGS. 8A to 8C.

In a case of the interactive type of the record information shown in FIGS. 8A to 8C, the construction addition information IJ is described as shown in FIG. 9C. Here, for example, when the specified signal Sz indicating the access to a portion of a time of [y] from the beginning of reproducing |question 2| of the record information shown in FIG. 8, the controller 20 carries out the following operations (1) to (3).

(1) On the basis of the start address data IJS included in the construction addition information SJ (FIG. 9C), the start address [d] of the question 2 is obtained.

(2) A position of [d] is detected from the elapsed time information (CELTC data SJC) within the reproduction addition information SJ of the partial record information corresponding to the question 2, and the slider control signal Sx is outputted in order to move the optical pickup 10 to the position on the optical disk DK corresponding to the above detected position.

(3) The reproduction is started from the position of the elapsed time [d] in the question 2.

The above mentioned process is the reproduction operation in which the construction addition information IJ is used, in a case of the interactive type of the record information.

As mentioned above, according to the reproduction operation of the information reproducing apparatus S2 which uses the reproduction addition information SJ and the construction addition information IJ, the elapsed time information (CELTC data SJC) included in the reproduction addition information SJ is multiplexed to the video signal extended on the basis of the corresponding to the PTS. Thus, it is possible to easily multiplex the video signal and the elapsed time information. As a result, the elapsed time information can be multiplexed for the demodulated and extended video information without increasing a load of the signal process controller 27 in the information reproducing apparatus S2.

Further, the elapsed time information is reset at the lead for each partial record information, added in a reproducing order of the partial record information and displayed as the total elapsed time. Thus, even if a recording order and the reproducing order for every partial record information are different from each other, it is possible to display a correct total elapsed time corresponding to a reproduced whole record information.

Therefore, even in a case of reproducing the interactive type of the record information, it is possible to display the correct total elapsed time.

Further, since the reproduction addition information SJ and the construction addition information IJ are detected together with the record information, when the desired reproduction position with the reproduction start position of the record information as the start point is inputted, it is possible to detect the partial record information including the appropriate reproduction position, and also possible to quickly reproduce the record information corresponding to the appropriate reproduction position with the PTS as the standard.

Furthermore, at a time of reproducing the record information, even if the recording order and the reproducing order for every partial record information are different from each other, when the desired reproduction position with the start position of the partial record information as the start point is inputted, it is possible to detect the partial record information including the appropriate reproduction position, and also possible to quickly reproduce the record information corresponding to the appropriate reproduction position with the PTS as the standard.

(III) Modified Embodiment

In the above mentioned embodiments, although the construction addition information IJ is recorded at the most inner circumference portion of the optical disk, the present invention is not limit to it. In a case that there are a plurality o f pieces of the record information on one optical disk, for example, the file forms in conformity to the ISO (International Organization for Standardization) 9660 may be employed and the construction addition information IJ may be described at the lead portion of each of the files.

Further, the remote controller 18 may be a keyboard or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for recording record information, which includes video information and audio information and which are divided into a plurality of partial pieces of information in accordance with a predetermined content type of the record information in advance, to a record medium, comprising:

a first signal process unit, to which the record information is inputted, for compressing a video signal based on the video information by every predetermined compression unit to generate a compression video signal, and for dividing and multiplexing an audio signal, which is based on the audio information in correspondence with the video information, and the compression video signal respectively by every predetermined multiplexing unit, to output a compression multiplexed signal which is a signal that the divided audio signal and the divided compression video signal are time-multiplexed;

a second signal process unit for detecting a position in the record information of the video information corresponding to the video signal included in each compression unit to output a position signal for each compression unit;

a third signal process unit for detecting a reproduction time in a case of reproducing each of the partial pieces of information to generate a content information signal corresponding to content information indicating the detected reproduction time and the content type of the partial piece of information;

an addition information generating means for generating reproduction addition information including elapsed time information, which indicates an elapsed time within each of the partial pieces of information at a time of reproducing each of the partial pieces of information and which is reset at a lead portion of each of the partial pieces of information, and the time-axis information, which is counted from a beginning of the record information and which corresponds to the elapsed time, on the basis of the generated content information signal, to output a reproduction addition information signal;

a multiplexing means for multiplexing the reproduction addition information signal and the compression multiplexed signal for each of the compression unit in the compression multiplexed signal, such that the reproduction addition information signal is included in the multiplexing unit, which is within the compression unit and which is different from that including the audio or video compression signal, to output an information multiplexed compression signal, on the basis of the generated position signal; and a recording means for recording the information multiplexed compression signal to the record medium.

2. An apparatus according to claim 1, wherein the partial pieces of information have a mutual relationship along a time axis in the record information and at least a first partial piece of which has such a mutual relationship that a second partial piece thereof non-consecutive to the first partial piece along the time axis is to be reproduced prior to a third partial piece thereof consecutive to the first partial piece on the time axis after the first partial piece is reproduced.

3. An apparatus according to claim 1, wherein said multiplexing means adds the reproduction addition information signal such that the reproduction addition information signal is recorded at the lead portion of each of the partial pieces of information.

4. An apparatus according to claim 1, wherein:

said third signal process unit further detects a start position of each of the partial pieces of information in the record information, to generate the content information signal corresponding to the content information indicating the detected start position in addition to the detected reproduction time and the content type;

said addition information generating means further generates construction addition information including reproduction time information corresponding to the reproduction time and start position information corresponding to the start position for each of the partial pieces of information, to output a construction addition information signal; and said multiplexing means adds the construction addition information signal to the compression multiplexed signal such that the construction addition information signal is timely separated from the compression multiplexed signal.

5. An apparatus according to claim 4, wherein the partial pieces of information have a mutual relationship along a time axis in the record information and at least a first partial piece of which has such a mutual relationship that a second partial piece thereof non-consecutive to the first partial piece along the time axis is to be reproduced prior to a third partial piece thereof consecutive to the first partial piece on the time axis after the first partial piece is reproduced.

6. An apparatus according to claim 4, wherein said multiplexing means adds the construction addition information signal such that the construction addition information signal is recorded at a lead-in area of the record medium.

7. An apparatus for reproducing record information, which are divided into a plurality of partial pieces of information in accordance with a predetermined content type of the record information in advance, and reproduction addition information from a record medium on which the record information and the reproduction addition information are multiplexed by every predetermined multiplexing unit, said reproduction addition information including elapsed time information, which indicates an elapsed time within each of the partial pieces of information at a time of reproducing each of the partial pieces of information and which is reset at a lead portion of each of the partial pieces of information, and a time-axis information, which is counted from a beginning of the record information for every predetermined multiplexed unit and which corresponds to the elapsed time, said apparatus comprising:

a detecting means for detecting the record information and the reproduction addition information from said record medium and outputting a detection signal indicating the detected information;

an extracting means for extracting, from the detection signal, a reproduction addition information signal corresponding to the detected reproduction addition information;

a reproducing means for reproducing the record information on the basis of the detection signal; and a total elapsed time calculating means for, on the basis of the extracted reproduction addition information signal, adding the elapsed time within each of the partial pieces of information at a reproducing order to calculating a total elapsed time corresponding to the reproduced record information, and outputting a total elapsed time signal.

8. An apparatus according to claim 7, further comprising a display means for displaying the total elapsed time on the basis of the total elapsed time signal.

9. An information reproducing apparatus according to claim 7, wherein the record information includes video information, said extracting means extracts, from the detection signal, a compression video signal into which the reproduction addition information signal corresponding to the reproduction addition information and the video signal corresponding to the video information are compressed, and said reproducing means comprises:

an extending means for extending the extracted compression video signal and outputting the video signal; and an elapsed time information multiplexing means for multiplexing, on the basis of the extracted reproduction addition information signal and the extended video signal, the elapsed time information in the reproduction addition information signal corresponding to the time-axis information included the video signal, to the video signal as elapsed time information corresponding to the video signal, and outputting an elapsed time information multiplexed video signal.

10. An apparatus according to claim 7, wherein the partial pieces of information have a mutual relationship along a time axis in the record information and at least a first partial piece of which has such a mutual relationship that a second partial piece thereof non consecutive to the first partial piece along the time axis is to be reproduced prior to a third partial piece thereof consecutive to the first partial piece on the time axis after the first partial piece is reproduced.

11. An apparatus according to claim 7, wherein construction addition information is added to the record information on the record medium, said construction addition information including reproduction time information corresponding to a reproduction time and start position information corresponding to a start position for each of the partial pieces of information, said detecting means detects the construction addition information in addition to the record information and the reproduction addition information from said record medium according to a control signal, said extracting means further extracts, from the detection signal, a construction addition information signal corresponding to the detected construction addition information, said apparatus further comprises:

an information detection means for detecting, on the basis of the extracted construction addition information signal, the partial piece of information which includes the record information corresponding to a reproduction position where the reproduction is to be started according to an instruction inputted from the external, said reproduction position being specified with respect to the start position of the record information; and a control means for generating and outputting to said detecting means, the control signal to move said detecting means to a position on the record medium corresponding to the reproduction position within the detected partial piece of information and to reproduce the partial piece of information corresponding to the reproduction position.

12. An apparatus according to claim 7, wherein construction addition information is added to the record information on the record medium, said construction addition information including start position information corresponding to a start position for each of the partial pieces of information, said detecting means detects the construction addition information in addition to the record information and the reproduction addition information from said record medium according to a control signal, said extracting means further extracts, from the detection signal, a construction addition information signal corresponding to the detected construction addition information, said apparatus further comprises:

a position detection means for detecting, on the basis of the extracted construction addition information signal, the start position of the partial piece of information which includes a reproduction position where the reproduction is to be started according to an instruction inputted from the external, said reproduction position being specified with respect to the start position of the record information; and a control means for generating and outputting to said detecting means, the control signal to move said detecting means to a position on the record medium corresponding to the reproduction position within the detected start position and to reproduce the partial piece of information corresponding to the reproduction position.

13. An apparatus according to claim 12, wherein the partial pieces of information have a mutual relationship along a time axis in the record information and at least a first partial piece of which has such a mutual relationship that a second partial piece thereof non-consecutive to the first partial piece along the time axis is to be reproduced prior to a third partial piece thereof consecutive to the first partial piece on the time axis after the first partial piece is reproduced.

* * * * *